United States Patent
Maruyama et al.

(10) Patent No.: US 10,923,813 B2
(45) Date of Patent: Feb. 16, 2021

(54) ANTENNA DEVICE AND METHOD FOR REDUCING GRATING LOBE

(71) Applicant: MITSUBISHI ELECTRIC CORPORATION, Tokyo (JP)

(72) Inventors: Takashi Maruyama, Tokyo (JP); Satoshi Yamaguchi, Tokyo (JP); Masataka Otsuka, Tokyo (JP); Naoyuki Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 250 days.

(21) Appl. No.: 16/072,125

(22) PCT Filed: Jan. 29, 2016

(86) PCT No.: PCT/JP2016/052723
§ 371 (c)(1),
(2) Date: Jul. 23, 2018

(87) PCT Pub. No.: WO2017/130386
PCT Pub. Date: Aug. 3, 2017

(65) Prior Publication Data
US 2019/0058262 A1    Feb. 21, 2019

(51) Int. Cl.
*H01Q 3/26* (2006.01)
*H01Q 25/00* (2006.01)
(Continued)

(52) U.S. Cl.
CPC ............. *H01Q 3/26* (2013.01); *G01S 7/2813* (2013.01); *G01S 7/52047* (2013.01); *H01Q 25/00* (2013.01)

(58) Field of Classification Search
CPC .......... G01S 7/2813; H01Q 3/24; H01Q 3/26; H01Q 25/00
See application file for complete search history.

(56) References Cited

U.S. PATENT DOCUMENTS

| 7,081,851 B1 * | 7/2006 | Lewis | H01Q 21/0087 342/372 |
| 2013/0176173 A1 * | 7/2013 | Chew | H01Q 3/2629 342/372 |

(Continued)

FOREIGN PATENT DOCUMENTS

| JP | 9-232863 A | 9/1997 |
| JP | 2013-219742 A | 10/2013 |

(Continued)

OTHER PUBLICATIONS

Office Action issued in corresponding European Application No. 16887972.4 dated Jun. 24, 2019.
(Continued)

*Primary Examiner* — Erin F Heard
*Assistant Examiner* — Donald H B Braswell
(74) *Attorney, Agent, or Firm* — Birch, Stewart, Kolasch & Birch, LLP

(57) ABSTRACT

A signal combiner (33) specifies a weighting coefficient w for suppressing a grating lobe included in a composite signal $S_3$ obtained when combining a digital received signal $S_1$ and digital received signal $S_2$ stored by a signal calculation storage (31), from the gain in a grating lobe direction in a first radiation pattern and the gain in a grating lobe direction in a second radiation pattern, and combines the digital received signal $S_1$ and digital received signal $S_2$ stored by the signal calculation storage (31) using the weighting coefficient w.

13 Claims, 13 Drawing Sheets

(51) Int. Cl.
   *G01S 7/28* (2006.01)
   *G01S 7/52* (2006.01)

(56) References Cited

U.S. PATENT DOCUMENTS

| | | | | |
|---|---|---|---|---|
| 2013/0259254 | A1* | 10/2013 | Xiang | G10K 11/175 381/73.1 |
| 2016/0252608 | A1* | 9/2016 | Ebling | G01S 13/931 342/149 |
| 2016/0354062 | A1 | 12/2016 | Hwang | |
| 2017/0207529 | A1 | 7/2017 | Maruyama et al. | |

FOREIGN PATENT DOCUMENTS

| WO | WO 2011/057252 A1 | 5/2011 |
|---|---|---|
| WO | WO 2016/020954 A1 | 2/2016 |
| WO | WO 2016/021544 A1 | 2/2016 |

OTHER PUBLICATIONS

Extended European Search Report issued in corresponding EP Application No. 16887972.4 dated Dec. 14, 2018.
Maruyama et al., "Four-Element Array Antenna Using Pattern Reconfigurable Yagi-Uda Antenna with Complementary Parasitic Elements", IEICE Technical Report, AP 2014-154, Dec. 2014, pp. 19-24.

* cited by examiner

ANTENNA DEVICE AND METHOD FOR REDUCING GRATING LOBE

TECHNICAL FIELD

The present invention relates to an antenna device for suppressing a gain in the direction of a grating lobe included in a received signal of an array antenna and a method for reducing the grating lobe.

BACKGROUND ART

In a radar device or another similar device, as a technique for directing a peak of a radiation pattern in any direction by changing a pointing direction of an antenna, for example, a phased array antenna device capable of changing the phase shift amounts of phase shifters connected to element antennas constituting an array antenna can be used in some cases.

Also, as a technique for directing a peak of a radiation pattern in any direction, a digital-beam-forming antenna device capable of adjusting excitation phases of signals to be transmitted and/or received by element antennas constituting an array antenna can be used in some cases.

In the phased array antenna device and the digital-beam-forming antenna device, it is known that unnecessary radiation called a grating lobe is generated when an interval between element antennas constituting an array antenna is broadened for example to approximately one wavelength.

In radar devices equipped with the antenna devices, when the grating lobe is generated, if an object is present in the grating lobe direction, the object present in the grating lobe direction might be detected erroneously as an object present in the pointing direction. Therefore, it is desirable that the grating lobe is not generated.

Non-Patent Literature 1 listed below discloses an antenna device which includes an array antenna having a plurality of element antennas allowing for switching among radiation patterns, capable of switching among radiation patterns of the array antenna by switching among the radiation patterns of the element antennas, thereby to achieve improvement in the degree of freedom of the radiation pattern of the array antenna. In this antenna device, by improving the degree of freedom of the radiation pattern of the array antenna, the gain of a grating lobe is reduced by approximately 10 dB as compared with a gain in a desired direction.

Also, Patent Literature 1 listed below discloses an antenna device in which an auxiliary array antenna is arranged in addition to a main array antenna, capable of combining the signals of the main array antenna and auxiliary array antenna to thereby reduce the gain of a grating lobe.

CITATION LIST

Patent Literature

Patent Literature 1: Japanese Patent Application Publication No. 1997(H09)-232863.

Non-Patent Literature

Non-Patent Literature 1: Maruyama et al., Four-Element Array Antenna Using Pattern Reconfigurable Yagi-Uda Antenna with Complementary Parasitic Elements, IEICE Tech., AP 2014-154, December 2014.

SUMMARY OF INVENTION

Technical Problem

Since the conventional antenna devices are configured as described above, in the case of Non-Patent Literature 1, the gain of the grating lobe may be reduced by approximately 10 dB as compared with the gain in the desired direction. However, the grating lobe cannot be completely suppressed only by improving the degree of freedom of the radiation pattern of the array antenna, and there is the problem with an application to radar devices and other similar devices that an object in the grating lobe direction might be erroneously detected.

In addition, in the case of Patent Literature 1, since it is necessary to arrange the auxiliary array antenna in addition to the main array antenna, complexity of the configuration arises, and there is the problem that an application is impossible when the auxiliary array antenna cannot be arranged. Also, since an opening of the auxiliary array antenna is typically smaller than an opening of the main array antenna, the beam width of the auxiliary array antenna is wider than the beam width of the main array antenna. With this, there is the problem that a low-level unnecessary lobe is generated in a wide angular range in compensation for reduction of a high-level unnecessary lobe.

The present invention is made in order to solve the above-described problems, and an object or the present invention is to obtain an antenna device and method for reducing a grating lobe, capable of suppressing a grating lobe without disposition of an auxiliary array antenna.

Solution to Problem

In accordance with the present invention, there is provided an array antenna which includes an array antenna including a plurality of element antennas which are configured to allow for switching among radiation patterns; a radiation pattern controller configured to change the radiation patterns of the plurality of element antennas thereby to set a radiation pattern of the array antenna; a signal detector configured to detect a received signal of the array antenna each time the radiation pattern of the array antenna is newly set by the radiation pattern controller; and a signal processor configured to specify one or more weighting coefficients for suppressing a grating lobe included in a composite signal obtained when combining received signals detected by the signal detector when respective radiation patterns of the array antenna are set, from gains in a grating lobe direction in radiation patterns of the array antenna which are set by the radiation pattern controller, and configured to combine the received signals detected by the signal detector when the respective radiation patterns of the array antenna are set, by using the one or more weighting coefficient.

Advantageous Effects of Invention

According to the present invention, it is configured such that the signal processor specifies one or more weighting coefficients for suppressing a grating lobe included in a composite signal obtained when combining received signals detected by the signal detector when respective radiation patterns of the array antenna are set, from gains in a grating lobe direction in radiation patterns of the array antenna which are set by the radiation pattern controller, and combines the received signals detected by the signal detector when the respective radiation patterns of the array antenna are set, by using the one or more weighting coefficients, thus allowing for an effect of suppressing the grating lobe without disposition of an auxiliary array antenna.

DESCRIPTION OF EMBODIMENTS

A mode for carrying out the present invention is hereinafter described with reference to the attached drawings in order to describe the present invention in more detail.

First Embodiment

Figure 1:
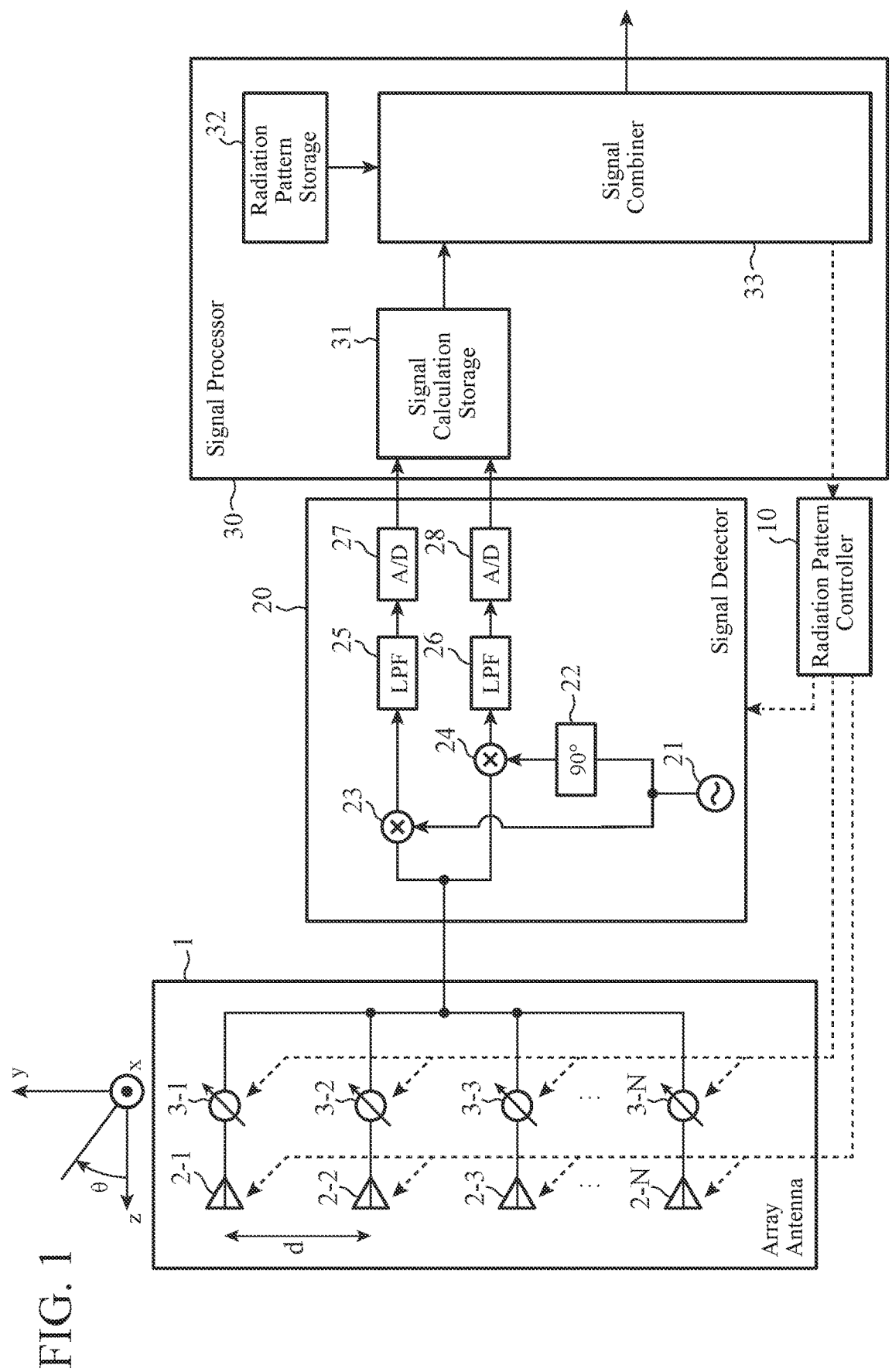
FIG. 1 is a configuration diagram illustrating an antenna device according to a first embodiment of the present invention.

FIG. 1 is a configuration diagram illustrating an antenna device according to a first embodiment of the present invention.

In FIG. 1, an array antenna 1 includes N element antennas 2-1 to 2-N and N phase shifters 3-1 to 3-N.

N is an integer equal to or larger than two, and the numbers of element antennas 2 and phase shifters 3 are not limited as long as they are two or larger.

In an example of FIG. 1, the array antenna 1 includes N phase shifters 3-1 to 3-N, but the N phase shifters 3-1 to 3-N may also be provided outside the array antenna 1.

The element antennas 2-1 to 2-N are configured to allow for switching among radiation patterns, and the element antennas 2-1 to 2-N are arranged at an interval of d.

The element antennas 2-1 to 2-N are configured for example to allow for switching between a radiation pattern indicating a high gain in a pointing direction and a low gain in a grating lobe direction, and a radiation pattern indicating a low gain in a pointing direction and a high gain in a grating lobe direction.

The element antennas 2-1 to 2-N allowing for switching among radiation patterns are disclosed, for example, in Non-Patent Literature 1 described above. Nonetheless, as long as the element antennas 2-1 to 2-N allow for the switching among radiation patterns, they are not limited to the element antennas disclosed in Non-Patent Literature 1, and may be element antennas having any configuration. Therefore, for example, with respect to one element antenna 2 comprised of a combination of element antennas pointing in different directions, its radiation pattern can be changed by mechanically selecting one from among the element antennas. Alternatively, the pointing direction of one element antenna 2 can be electronically changed.

In the first embodiment, the interval d between respective element antennas 2-1 to 2-N is assumed to be a length of one wavelength of a radio wave received by the element antennas 2-1 to 2-N, for example, and a grating lobe is generated.

In the first embodiment, it is assumed that the element antennas 2-1 to 2-N are used as reception antennas which receive the radio waves, but the element antennas 2-1 to 2-N may also serve as transmission antennas which transmit the radio waves.

The phase shifters 3-1 to 3-N shift phases of received signals of the element antennas 2-1 to 2-N by phase shift amounts provided by a radiation pattern controller 10 and output phase-shifted received signals to a signal detector 20.

The radiation pattern controller 10 is comprised of, for example, a semiconductor integrated circuit incorporating a central processing unit (CPU), a one-chip microcomputer or another similar device, and sets the radiation pattern of the array antenna 1 by changing the radiation patterns of the element antennas 2-1 to 2-N.

When the pointing direction in the radiation pattern of the array antenna 1 is changed, the radiation pattern controller 10 changes the phase shift amounts of the phase shifters 3-1 to 3-N.

Although an example in which the radiation pattern controller 10 sets a first radiation pattern in which the gain in the pointing direction is higher than the gain in the grating lobe direction for the array antenna 1 and sets a second radiation pattern in which the gain in the pointing direction is lower than the gain in the grating lobe direction for the array antenna 1 is described in the first embodiment, it is possible to set three or more types of radiation patterns for the array antenna 1.

An example of setting three or more types of radiation patterns for the array antenna 1 is described in a third embodiment.

The signal detector 20 includes an oscillator 21, a 90-degree phase shifter 22, mixers 23 and 24, low pass filters (hereinafter referred to as "LPFs") 25 and 26, and analog/digital converters (hereinafter referred to as "A/D converters") 27 and 28, and each time a new radiation pattern is set by the radiation pattern controller 10, this detects the received signal of the array antenna 1.

That is, when the first radiation pattern is set by the radiation pattern controller 10, the signal detector 20 detects an in-phase (I) signal and a quadrature (Q) signal which are orthogonal signals, from the received signal of the array antenna 1, and when the second radiation pattern is set by the radiation pattern controller 10, this detects the I signal and the Q signal which are orthogonal signals, from the received signal of the array antenna 1.

The oscillator 21 outputs a local oscillation signal to the 90-degree phase shifter 22 and the mixer 23.

The 90-degree phase shifter 22 shifts a phase of the local oscillation signal output from the oscillator 21 by 90 degrees and outputs a phase-shifted local oscillation signal to the mixer 24.

The mixer 23 converts a frequency of the received signal of the array antenna 1 from a radio frequency to an intermediate frequency by multiplying the received signal by the local oscillation signal output from the oscillator 21 and outputs the received signal of the intermediate frequency.

The mixer 24 converts the frequency of the received signal of the array antenna 1 from the radio frequency to the intermediate frequency by multiplying the received signal by the phase-shifted local oscillation signal output from the 90-degree phase shifter 22 and outputs the received signal of the intermediate frequency.

The LPF 25 blocks passage of a harmonic included in the received signal output from the mixer 23 and outputs only a baseband signal included in the received signal to the A/D converter 27.

The LPF 26 blocks passage of a harmonic included in the received signal output from the mixer 24 and outputs only a baseband signal included in the received signal to the A/D converter 28.

The A/D converter 27 converts the analog baseband signal output from the LPF 25 into a digital signal and outputs the digital signal to the signal processor 30.

The A/D converter 28 converts the analog baseband signal output from the LPF 26 into a digital signal and outputs the digital signal to the signal processor 30.

Although an example in which the signal detector 20 includes the oscillator 21, the 90-degree phase shifter 22, the mixers 23 and 24, the LPFs 25 and 26, and the A/D converters 27 and 28 is described in the first embodiment, it suffices as long as the received signal of the array antenna 1 may be detected and the received signal may be converted into the digital signal, and the signal detector 20 may have another configuration.

A signal processor 30 including a signal calculation storage 31, a radiation pattern storage 32, and a signal combiner 33 performs processing to combine the received signals detected by the signal detector 20 when each radiation pattern of the array antenna 1 is set.

Figure 2:
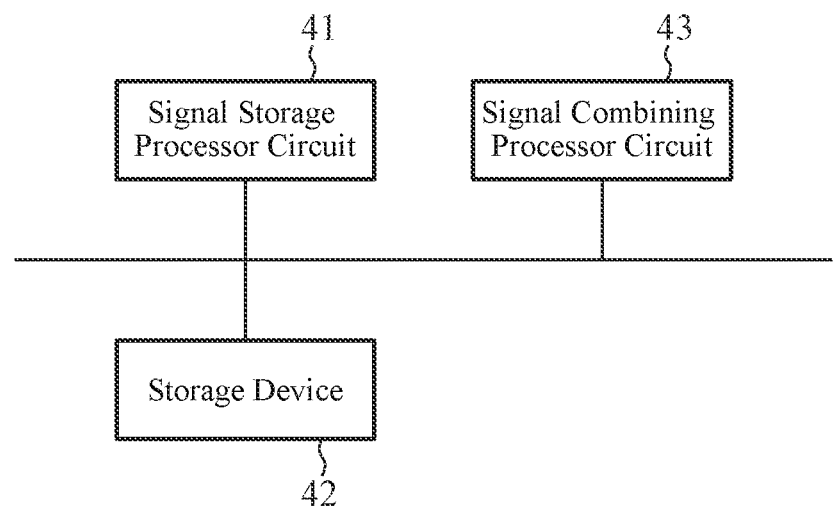
FIG. 2 is a hardware configuration diagram of a signal processor 30 in the antenna device according to the first embodiment of the present invention.

FIG. 2 is a hardware configuration diagram of the signal processor 30 in the antenna device according to the first embodiment of the present invention.

The signal calculation storage 31 is implemented for example by a signal storage processor circuit 41 comprised of a one-chip microcomputer or a semiconductor integrated circuit incorporating a CPU, together with a memory, and another similar device, and calculates a digital received signal indicating an amplitude and phase of the received signal of the array antenna 1, from the digital signals, each time the digital signals are output from the A/D converters 27 and 28 of the signal detector 20 and stores the digital received signal. In addition, the signal calculation storage 31 constitutes a signal storage.

The radiation pattern storage 32, which is implemented for example by a storage device 42 such as a random access memory (RAM) and a hard disk, stores the first and second radiation patterns to be set by the radiation pattern controller 10.

The signal combiner 33 is implemented for example by a signal combining processor circuit 43 comprised of a semiconductor integrated circuit incorporating a CPU, a one-chip microcomputer or another similar device, and performs processing to specify a weighting coefficient for suppressing a grating lobe included in a composite signal obtained when combining two digital received signals stored by the signal calculation storage 31, more specifically when combining the digital received signal calculated when the first radiation pattern is set and the digital received signal calculated when the second radiation pattern is set, from the gain in a grating lobe direction in the first radiation pattern and the gain in a grating lobe direction in the second radiation pattern, and then, to combine two digital received signals stored by the signal calculation storage 31 by using the weighting coefficient.

In the example of FIG. 1, it is assumed that each of the signal calculation storage 31, the radiation pattern storage 32, and the signal combiner 33, which are components of the signal processor 30, is comprised of dedicated hardware. Alternatively, the signal processor 30 can be comprised of a computer.

Figure 3:
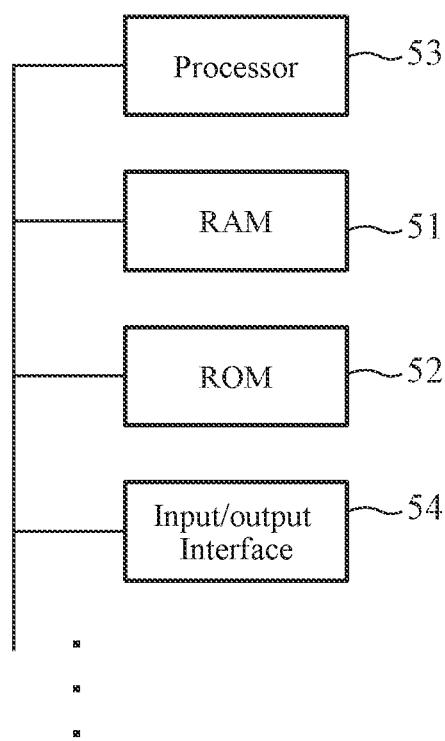
FIG. 3 is a hardware configuration diagram when the signal processor 30 is comprised of a computer.

FIG. 3 is a hardware configuration diagram in a case where the signal processor 30 is comprised of a computer.

In the case where the signal processor 30 is comprised of the computer, a memory function of the signal calculation storage 31 can be configured on a RAM 51 of the computer, the radiation pattern storage 32 can be configured on the RAM 51 or a read only memory (ROM) 52. Further, a program describing the contents for operations of the signal calculation storage 31 and the signal combiner 33 can be stored in the ROM 52, and a processor 53 of the computer can execute the program stored in the ROM 52.

In this regard, the computer is provided with an input/output interface 54 for connecting to the radiation pattern controller 10. As the input/output interface 54, a peripheral component interconnect (PCI) bus and other components can be used.

Although a case in which the signal processor 30 is comprised of the computer is herein described, the signal processor 30 may also be comprised of a digital signal processor (DSP) or a field-programmable gate array (FPGA), and the input/output interface 54 may be a bus of the DSP or FPGA.

Figure 4:
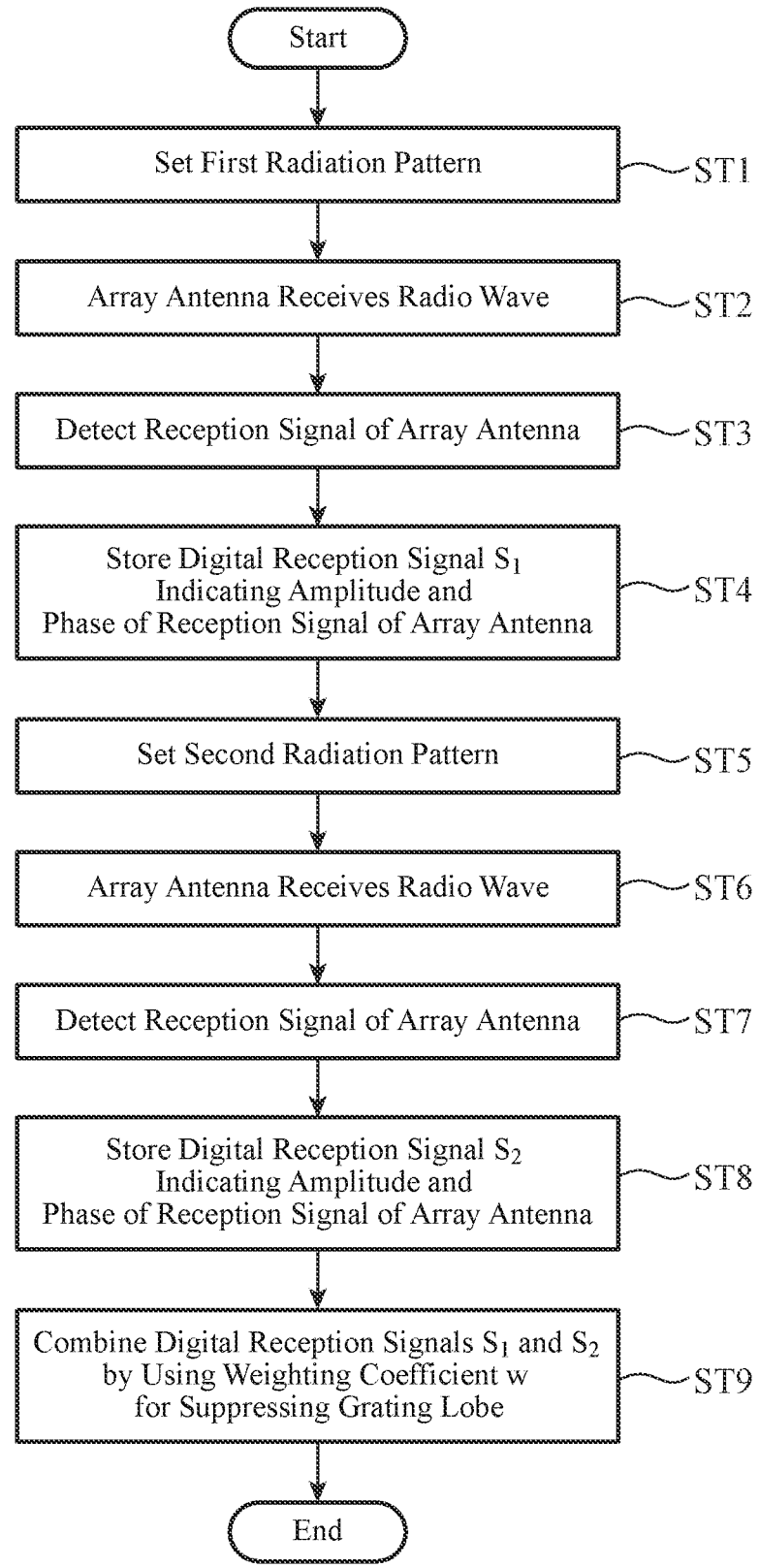
FIG. 4 is a flowchart illustrating a method for reducing a grating lobe being a processing content of the antenna device according to the first embodiment of the present invention.

FIG. 4 is a flowchart illustrating a method for reducing grating lobes which is a processing content of the antenna device according to the first embodiment of the present invention.

Figure 5:
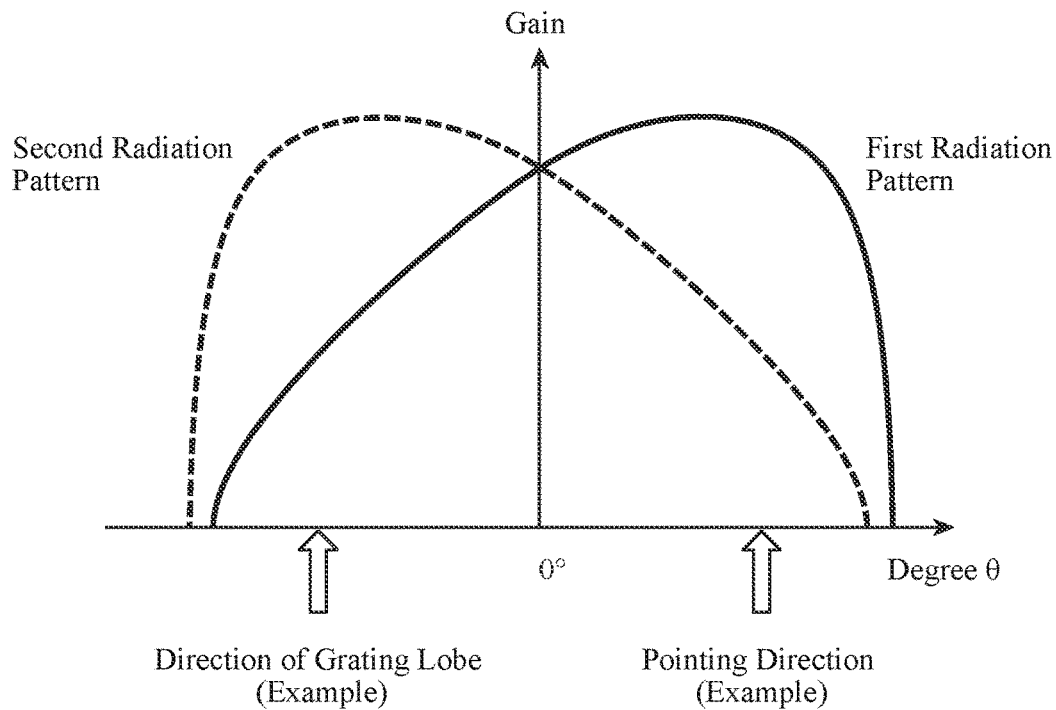
FIG. 5 is an explanatory graph which schematically illustrates a first radiation pattern indicating a gain in a pointing direction that is higher than a gain in a grating lobe direction, and a second radiation pattern indicating a gain in the pointing direction is lower than a gain in the grating lobe direction.

FIG. 5 is an explanatory graph which schematically illustrates a first radiation pattern indicating a gain in the pointing direction that is higher than a gain in the grating lobe direction, and a second radiation pattern indicating a gain in the pointing direction that is lower than a gain in the grating lobe direction.

In FIG. 5, a solid line indicates the first radiation pattern and a broken line indicates the second radiation pattern.

Next, operations will be described.

First, the signal combiner 33 of the signal processor 30 outputs a command for setting the first radiation pattern to the radiation pattern controller 10.

Upon receiving the command for setting the first radiation pattern from the signal combiner 33 of the signal processor 30, the radiation pattern controller 10 sets the radiation pattern of the array antenna 1 to the first radiation pattern by changing the radiation patterns of the element antennas 2-1 to 2-N (step ST1 in FIG. 4).

Herein, the radiation pattern of the array antenna 1 is determined by a product of an array factor determined by arrangement of the element antennas 2-1 to 2-N and the radiation patterns of the element antennas 2-1 to 2-N, and the pointing direction of the array antenna 1 may be changed by changing the phase shift amounts of the phase shifters 3-1 to 3-N.

Figure 6:
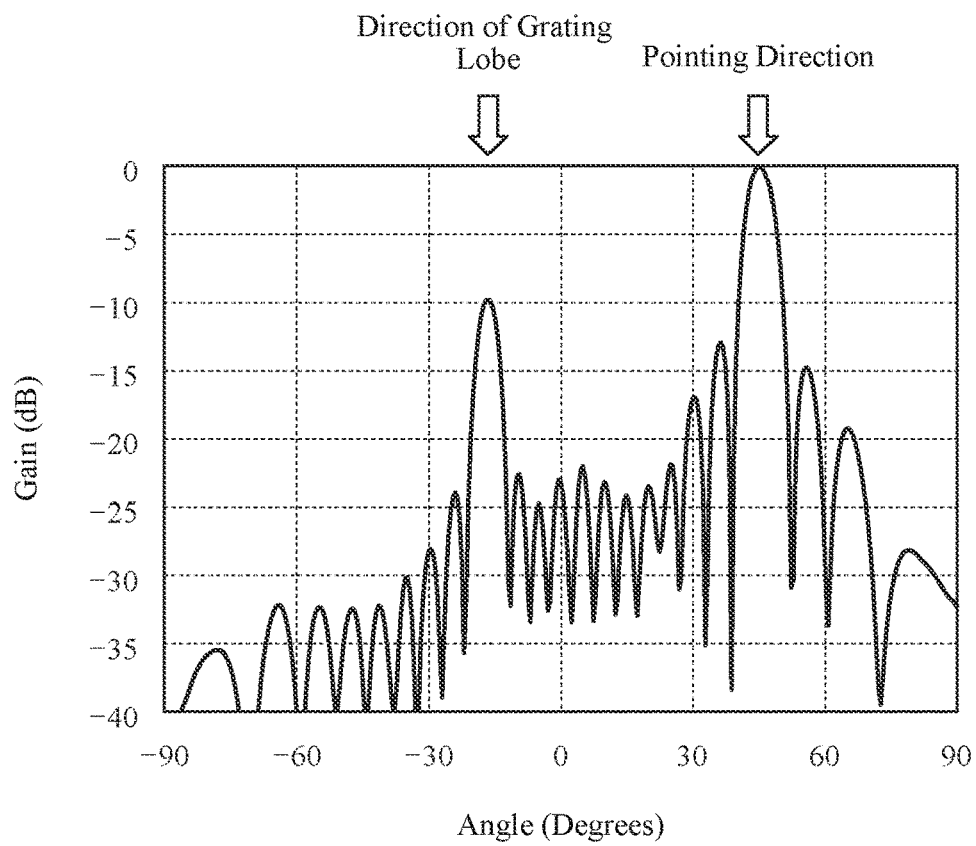
FIG. 6 is an explanatory graph illustrating gains in a first radiation pattern where an interval d between element antennas 2-1 to 2-N is the length of one wavelength and the pointing direction is a direction of 45 degrees.

FIG. 6 is an explanatory graph illustrating gains in a first radiation pattern where an interval d between the element antennas 2-1 to 2-N is the length of one wavelength and the pointing direction is a direction of 45 degrees.

In the first radiation pattern, the grating lobe is generated in a direction of −17 degrees as illustrated in FIG. 6. However, the first radiation pattern of the array antenna 1 is set by setting radiation patterns in which a gain in the pointing direction is high and a gain in the grating lobe direction is low, as the radiation patterns of the element antennas 2-1 to 2-N, so that the gain of the grating lobe is reduced also in the first radiation pattern.

In the example of FIG. 6, the gain in the grating lobe direction is lower than the gain in the pointing direction by approximately 10 dB. However, the grating lobe remains.

The array antenna 1 receives the radio wave arriving when the radiation pattern controller 10 sets the first radiation pattern, and outputs the received signal to the signal detector 20 (step ST2 in FIG. 4).

In this regard, the radio wave received by the array antenna 1 is assumed to be a radio wave such as a radio wave transmitted from an external device disposed at a different point away from the antenna device, or a radio wave reflected by a substance such as an object existing in a space.

When the first radiation pattern is set by the radiation pattern controller 10, the signal detector 20 detects the received signal of the array antenna 1 (step ST3).

That is, when the radiation pattern controller 10 sets the first radiation pattern, the oscillator 21 of the signal detector 20 outputs the local oscillation signal to the 90-degree phase shifter 22 and the mixer 23.

Upon receiving the local oscillation signal from the oscillator 21, the 90-degree phase shifter 22 shifts the phase of the local oscillation signal by 90 degrees and outputs the phase-shifted local oscillation signal to the mixer 24.

The mixer 23 converts the frequency of the received signal of the array antenna 1 from the radio frequency to the intermediate frequency by multiplying the received signal by the local oscillation signal output from the oscillator 21 and outputs the received signal of the intermediate frequency to the LPF 25.

The mixer 24 converts the frequency of the received signal of the array antenna 1 from the radio frequency to the intermediate frequency by multiplying the received signal by the phase-shifted local oscillation signal output from the 90-degree phase shifter 22 and outputs the received signal of the intermediate frequency to the LPF 26.

Upon receiving the received signal of the intermediate frequency from the mixer 23, the LPF 25 blocks the passage of the harmonic included in the received signal, and outputs only the baseband signal included in the received signal to the A/D converter 27.

Upon receiving the received signal of the intermediate frequency from the mixer 24, the LPF 26 blocks the passage of the harmonic included in the received signal, and outputs only the baseband signal included in the received signal to the A/D converter 28.

Upon receiving the baseband signal from the LPF 25, the A/D converter 27 converts the baseband signal into the digital signal and outputs the digital signal to the signal processor 30.

Upon receiving the baseband signal from the LPF 26, the A/D converter 28 converts the baseband signal into the digital signal and outputs the digital signal to the signal processor 30.

Meanwhile, the digital signal output from the A/D converter 27 corresponds to the I signal, and the digital signal output from the A/D converter 28 corresponds to the Q signal.

Upon receiving the digital signals from the A/D converters 27 and 28 of the signal detector 20, the signal calculation storage 31 of the signal processor 30 calculates a digital received signal $S_1$ indicating amplitude m and a phase φ of the received signal of the array antenna 1 from the digital signals and stores the digital received signal $S_1$ (step ST4 in FIG. 4).

Assuming that the digital signal output from the A/D converter 27 is I and the digital signal output from the A/D converter 28 is Q, the amplitude m and the phase φ of the received signal of the array antenna 1 are calculated as the following equations (1) and (2).

$$m = \sqrt{I^2 + Q^2} \quad (1)$$

$$\phi = \tan^{-1}\left(\frac{Q}{I}\right) \quad (2)$$

Next, the signal combiner 33 of the signal processor 30 outputs a command for setting the second radiation pattern to the radiation pattern controller 10.

Upon receiving the command for setting the second radiation pattern from the signal combiner 33 of the signal processor 30, the radiation pattern controller 10 sets the radiation pattern of the array antenna 1 to the second radiation pattern by changing the radiation patterns of the element antennas 2-1 to 2-N (step ST5 in FIG. 4).

Figure 7:
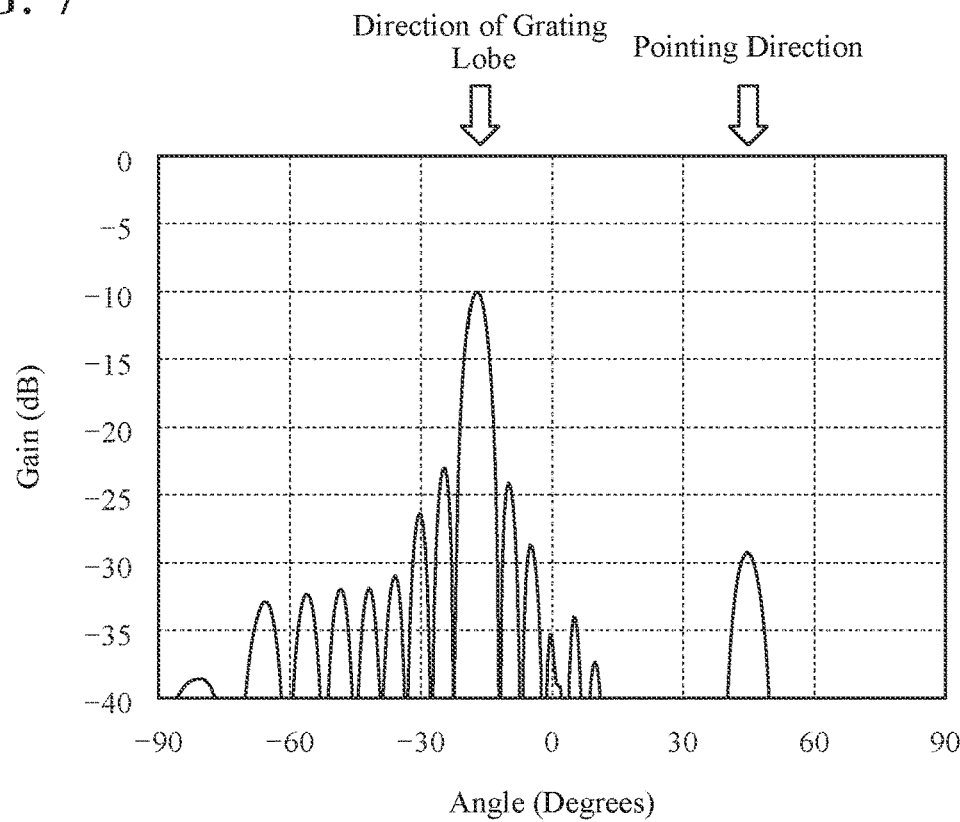
FIG. 7 is an explanatory graph illustrating gains in a second radiation pattern where an interval d between the element antennas 2-1 to 2-N is the length of one wavelength and the pointing direction is the direction of 45 degrees.

FIG. 7 is an explanatory graph illustrating gains in a second radiation pattern where an interval d between the element antennas 2-1 to 2-N is the length of one wavelength and the pointing direction is the direction of 45 degrees.

In the second radiation pattern, as illustrated in FIG. 7, the grating lobe is generated in the direction of −17 degrees. However, the second radiation pattern of the array antenna 1 is set by setting the radiation pattern in which a gain in the pointing direction is low and a gain in the grating lobe direction is high, as the radiation patterns of the element antennas 2-1 to 2-N, so that the gain in the grating lobe direction is higher than the gain in the pointing direction in the second radiation pattern.

In the example of FIG. 7, the gain in the grating lobe direction is higher than the gain in the pointing direction by approximately 18 dB.

In this regard, since the pointing direction is the same in the first radiation pattern and the second radiation pattern, and the grating lobe direction is the same in the first radiation pattern and the second radiation pattern, the phase shift amounts of the phase shifters 3-1 to 3-N at the time of the setting of the first radiation pattern and the phase shift amounts of the phase shifters 3-1 to 3-N at the time of the setting of the second radiation pattern are the same. In this case, when the first radiation pattern is changed to the second radiation pattern, if a radiation phase of each element antenna 2 is changed due to a cause such as an influence associated with the change in the radiation patterns of the element antennas 2-1 to 2-N, the phase shift amounts of the phase shifters 3-1 to 3-N can be changed to direct the element antennas 2-1 to 2-N in the grating lobe direction.

The array antenna 1 receives the radio wave arriving when the radiation pattern controller 10 sets the second radiation pattern and outputs the received signal to the signal detector 20 (step ST6 in FIG. 4).

When the second radiation pattern is set by the radiation pattern controller 10, the signal detector 20 detects the received signal of the array antenna 1 (step ST7).

That is, when the radiation pattern controller 10 sets the second radiation pattern, the oscillator 21 of the signal detector 20 outputs the local oscillation signal to the 90-degree phase shifter 22 and the mixer 23.

Upon receiving the local oscillation signal from the oscillator 21, the 90-degree phase shifter 22 shifts the phase of the local oscillation signal by 90 degrees and outputs the phase-shifted local oscillation signal to the mixer 24.

The mixer 23 converts the frequency of the received signal of the array antenna 1 from the radio frequency to the intermediate frequency by multiplying the received signal by the local oscillation signal output from the oscillator 21 and outputs the received signal of the intermediate frequency to the LPF 25.

The mixer 24 converts the frequency of the received signal of the array antenna 1 from the radio frequency to the intermediate frequency by multiplying the received signal by the phase-shifted local oscillation signal output from the 90-degree phase shifter 22 and outputs the received signal of the intermediate frequency to the LPF 26.

Upon receiving the received signal of the intermediate frequency from the mixer 23, the LPF 25 blocks the passage of the harmonic included in the received signal, and outputs only the baseband signal included in the received signal to the A/D converter 27.

Upon receiving the received signal of the intermediate frequency from the mixer 24, the LPF 26 blocks the passage of the harmonic included in the received signal, and outputs only the baseband signal included in the received signal to the A/D converter 28.

Upon receiving the baseband signal from the LPF 25, the A/D converter 27 converts the baseband signal into the digital signal and outputs the digital signal to the signal processor 30.

Upon receiving the baseband signal from the LPF 26, the A/D converter 28 converts the baseband signal into the digital signal and outputs the digital signal to the signal processor 30.

Upon receiving the digital signals from the A/D converters 27 and 28 of the signal detector 20, the signal calculation storage 31 of the signal processor 30 calculates a digital received signal $S_2$ indicating the amplitude m and the phase $\varphi$ of the received signal of the array antenna 1 from the digital signals and stores the digital received signal $S_2$ (step ST8 in FIG. 4).

Assuming that the digital signal output from the A/D converter 27 is I and the digital signal output from the A/D converter 28 is Q, the amplitude m and the phase $\varphi$ of the received signal of the array antenna 1 are calculated as equations (1) and (2) described above.

The signal combiner 33 of the signal processor 30 refers to the first radiation pattern and second radiation pattern stored in the radiation pattern storage 32 to confirm the gain and phase in the grating lobe direction in the first radiation pattern, and the gain and phase in the grating lobe direction in the second radiation pattern.

From the gain and phase in a grating lobe direction in the first radiation pattern and the gain and phase in a grating lobe direction in the second radiation pattern, a weighting coefficient w is specified for suppressing a grating lobe included in the composite signal obtained when the digital received signal $S_1$ and digital received signal $S_2$ stored by the signal calculation storage 31 are combined.

For example, assuming that a variable indicating the gain and phase in the grating lobe direction in the first radiation pattern is $G_0$ and a variable indicating the gain and phase in the grating lobe direction in the second radiation pattern is $G_S$, the weighting coefficient w is represented as the following equation (3).

$$w = \frac{G_0}{G_s} \qquad (3)$$

Upon specifying the weighting coefficient w, the signal combiner 33 uses the weighting coefficient w to combine the digital received signal $S_1$ and digital received signal $S_2$ stored by the signal calculation storage 31 as represented by equation (4) shown below, and outputs a composite signal $S_3$ (step ST9 in FIG. 4).

$$S_3 = S_1 - wS_2 \qquad (4)$$

where $S_1$, $S_2$, $S_3$, and w are complex numbers represented by $Ae^{j\varphi}$. The letter "A" represents an amplitude and $\varphi$ represents a phase.

In equation (4), the signal arriving from the pointing direction is a signal close to the digital received signal $S_1$ with a first term on a right side dominant.

On the other hand, the signal arriving from the grating lobe direction is canceled by the first term and a second term on the right side and becomes almost zero.

As a result, the signal arriving from the pointing direction is hardly influenced by the calculation of equation (4), but the gain of the signal arriving from the grating lobe direction is reduced.

A third radiation pattern is virtually formed by combining the digital received signal $S_1$ and the digital received signal $S_2$ in the signal combiner 33.

Figure 8:
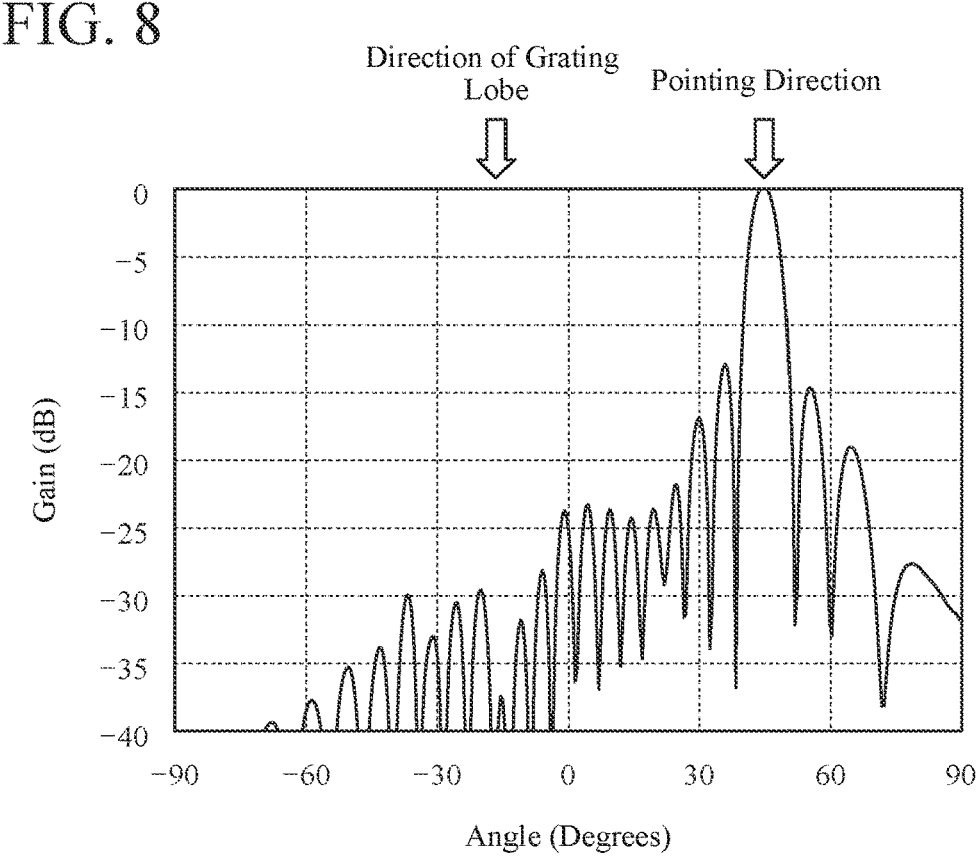
FIG. 8 is an explanatory graph illustrating a third radiation pattern virtually formed by combining in a signal combiner 33.

FIG. 8 is an explanatory graph illustrating a third radiation pattern virtually formed by combining in the signal combiner 33.

As a result, the composite signal $S_3$ output from the signal combiner 33 corresponds to the received signal of the array antenna 1 in the virtually-formed third radiation pattern.

From FIG. 8, it is understood that there is substantially no grating lobe in the third radiation pattern.

It is to be noted that the composite signal $S_3$ output from the signal combiner 33 may be used for any signal processing such as radar signal processing.

As is clear from the above descriptions, according to the first embodiment, it is configured such that the signal combiner 33 specifies the weighting coefficient w for suppressing the grating lobe included in the composite signal $S_3$ obtained when combining the digital received signal $S_1$ and digital received signal $S_2$ stored by the signal calculation storage 31, from the gain in the grating lobe direction in the first radiation pattern and the gain in the grating lobe direction in the second radiation pattern, and, then, combines the digital received signal $S_1$ and digital received signal $S_2$ stored by the signal calculation storage 31 by using the weighting coefficient w, thus allowing for an effect of suppressing the grating lobe without disposition of an auxiliary array antenna.

Second Embodiment

The first embodiment describes that a signal detector 20 detects a received signal of an array antenna 1 once when a first radiation pattern is set by a radiation pattern controller 10, and detects the received signal of the array antenna 1 once when a second radiation pattern is set by the radiation pattern controller 10, but it is also possible that this detects the received signal of the array antenna 1 a plurality of times when the first radiation pattern is set by the radiation pattern controller 10, and detects the received signal of the array antenna 1 a plurality of times when the second radiation pattern is set by the radiation pattern controller 10 such that the received signal of the array antenna 1 may be obtained even when a radio wave received by the array antenna 1 is weak.

Figure 9:
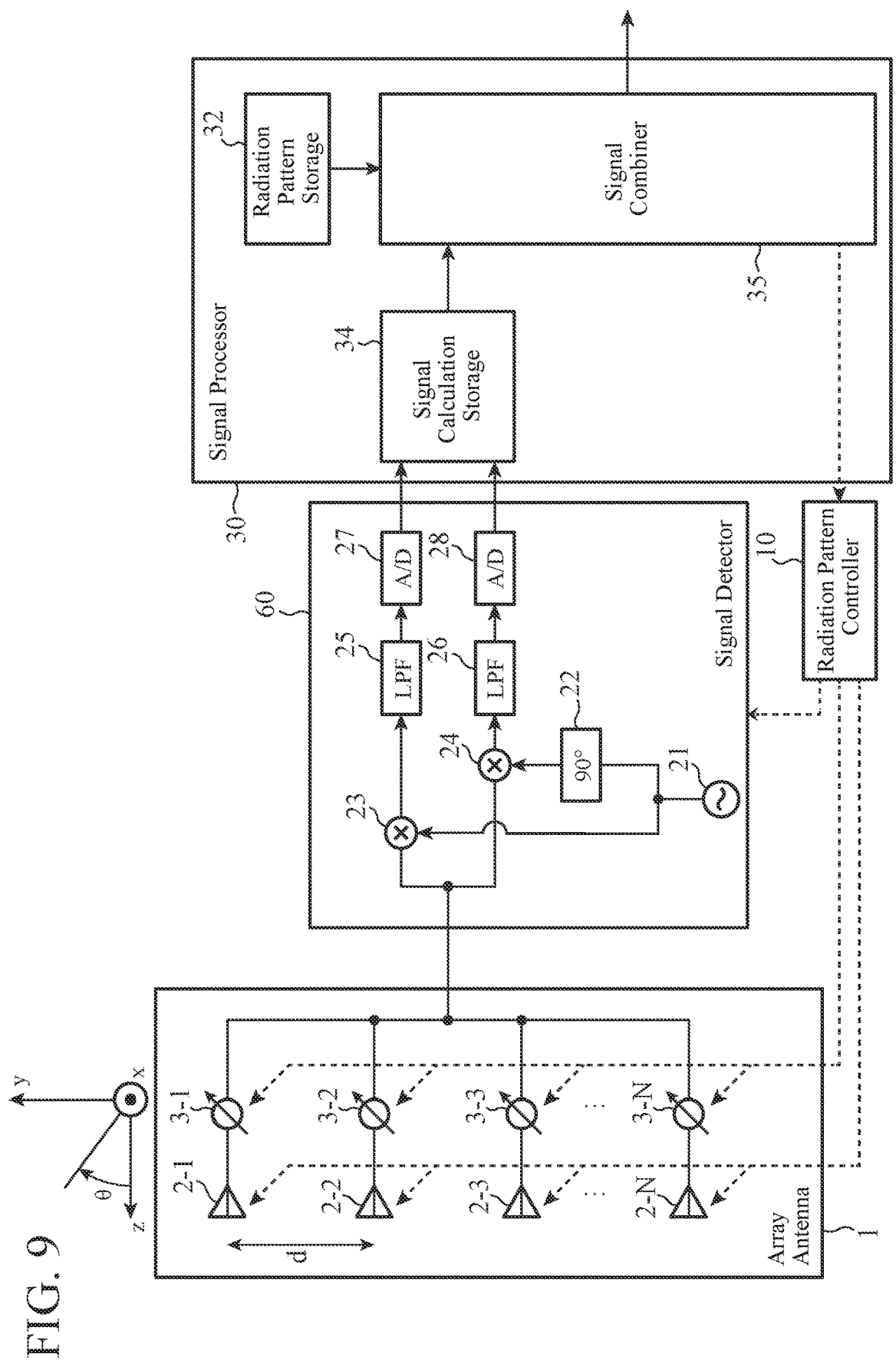
FIG. 9 is a configuration diagram illustrating an antenna device according to a second embodiment of the present invention.

FIG. 9 is a configuration diagram illustrating an antenna device according to a second embodiment of the present invention; in FIG. 9, the same reference sign as that in FIG. 1 represents the same or corresponding parts, so that the description thereof is omitted.

A signal detector 60 has the same configuration as that of the signal detector 20 in FIG. 1, but when the first radiation pattern is set by the radiation pattern controller 10, this detects the received signal of the array antenna 1 M times (M is an integer equal to or larger than two) and outputs M digital signals I (t) and Q (t) (t=1, 2, ..., and M). When the second radiation pattern is set by the radiation pattern controller 10, this detects the received signal of the array antenna 1 N times (N is an integer equal to or larger than two) and outputs N digital signals I (t) and Q (t) (t=1, 2, ..., and N). It is possible that M=N, M>M, or M<N.

The signal processor 30 includes a signal calculation storage 34, a radiation pattern storage 32, and a signal combiner 35.

The signal calculation storage 34, which is implemented for example by a signal storage processor circuit 41 shown in FIG. 2, when the first radiation pattern is set by the radiation pattern controller 10, calculates a digital received signal $S_1$ (t) indicating an amplitude m (t) and phase φ (t) of the received signal (first received signal) of the array antenna 1, from digital signals I (t) and Q (t), each time the digital signals I (t) and Q (t) are output from A/D converters 27 and 28 of the signal detector 60, and stores the digital received signal $S_1$ (t).

When the second radiation pattern is set by the radiation pattern controller 10, this calculates a digital received signal $S_2$ (t) indicating amplitude m (t) and a phase φ (t) of the received signal (second received signal) of the array antenna 1 from the digital signals I (t) and Q (t) each time the digital signals I (t) and Q (t) are output from the A/D converters 27 and 28 of the signal detector 60 to store the digital received signal $S_2$ (t).

Figure 10:
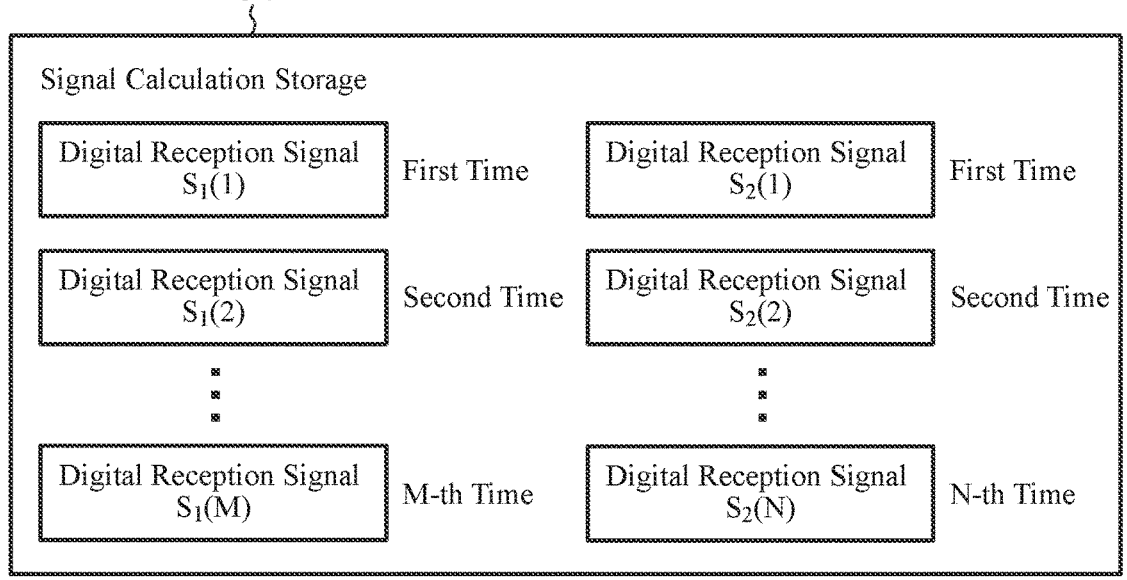
FIG. 10 is an explanatory diagram illustrating M digital received signals $S_1$ (t) and N digital received signals $S_2$ (t) which are stored by a signal calculation storage 34.

FIG. 10 is an explanatory diagram illustrating M digital received signals $S_1$ (t) and N digital received signals $S_2$ (t) which are stored by the signal calculation storage 34.

The signal combiner 35 is implemented for example by a signal combining processor circuit 43 shown in FIG. 2 and performs processing to specify a weighting coefficient w for suppressing a grating lobe included in a composite signal obtained when combining the total sum of the M digital received signals $S_1$ (t) and the total sum of the N digital received signals $S_2$ (t) stored by the signal calculation storage 31, from the gain in a grating lobe direction in the first radiation pattern and the gain in the grating lobe direction in the second radiation pattern, and to combine the total sum of the M digital received signals $S_1$ (t) and the total sum of the N digital received signals $S_2$ (t) stored by the signal calculation storage 31 by using the weighting coefficient w.

In the example of FIG. 9, it is assumed that each of the signal calculation storage 34, the radiation pattern storage 32, and the signal combiner 35, which are components of the signal processor 30, is comprised of dedicated hardware. Alternatively, the signal processor 30 may also be comprised of a computer.

In the case where the signal processor 30 is comprised of a computer, a memory function of the signal calculation storage 34 can be configured on a RAM 51 of the computer illustrated in FIG. 3, the radiation pattern storage 32 can be configured on the RAM 51 or a ROM 52. Further, a program describing the contents for operations of the signal calculation storage 34 and the signal combiner 35 can be stored in the ROM 52, and a processor 53 of the computer illustrated in FIG. 3 can execute the program stored in the ROM 52.

Next, operations will be described.

The signal combiner 35 of the signal processor 30 outputs a command for setting the first radiation pattern to the radiation pattern controller 10.

Upon receiving the command for setting the first radiation pattern from the signal combiner 35 of the signal processor 30, the radiation pattern controller 10 sets the radiation pattern of the array antenna 1 to the first radiation pattern by changing radiation patterns of element antennas 2-1 to 2-N as in the above-described first embodiment.

When the radiation pattern controller 10 sets the first radiation pattern, the signal detector 60 detects the received signal of the array antenna 1 M times and outputs the M digital signals I (t) and Q (t) (t=1, 2, ..., and M).

Detection processing of the received signal of the array antenna 1 is similar to that in the first embodiment, so that the detailed description thereof is omitted.

Each time the signal calculation storage 34 of the signal processor 30 receives the digital signals I (t) and Q (t) from the A/D converters 27 and 28 of the signal detector 60, the signal calculation storage 34 calculates the digital received signal $S_1$ (t) indicating the amplitude m (t) and phase φ (t) of the received signal of the array antenna 1 from the digital signals I (t) and Q (t) as represented by equations (5) and (6) shown below, and stores the digital received signal $S_1$ (t) as illustrated in FIG. 10.

$$m(t) = \sqrt{I^2(t) + Q^2(t)} \quad (5)$$

$$\phi(t) = \tan^{-1}\left(\frac{Q(t)}{I(t)}\right) \quad (6)$$

Next, the signal combiner 35 of the signal processor 30 outputs the command for setting the second radiation pattern to the radiation pattern controller 10.

Upon receiving the command for setting the second radiation pattern from the signal combiner 35 of the signal processor 30, the radiation pattern controller 10 sets the radiation pattern of the array antenna 1 to the second radiation pattern by changing the radiation patterns of the element antennas 2-1 to 2-N as in the above-described first embodiment.

When the radiation pattern controller 10 sets the second radiation pattern, the signal detector 60 detects the received signal of the array antenna 1 N times and outputs the N digital signals I (t) and Q (t) (t=1, 2, . . . , and N).

The signal calculation storage 34 of the signal processor 30 calculates the digital received signal $S_2$ (t) indicating the amplitude m (t) and the phase φ (t) of the received signal of the array antenna 1 from the digital signals I (t) and Q (t) as represented by above-described equations (5) and (6) each time this receives the digital signals I (t) and Q (t) from the A/D converters 27 and 28 of the signal detector 60 to store the digital received signal $S_2$ (t) as illustrated in FIG. 10.

The signal combiner 35 of the signal processor 30 refers to the first radiation pattern and second radiation pattern stored in the radiation pattern storage 32 to confirm the gain and phase in the grating lobe direction in the first radiation pattern, and the gain and phase in the grating lobe direction in the second radiation pattern.

The weighting coefficient w is specified for suppressing a grating lobe included in the composite signal obtained when combining the total sum of the digital received signals $S_1$ (t) and the total sum of the digital received signals $S_2$ (t) stored by the signal calculation storage 34, from the gain and phase in a grating lobe direction in the first radiation pattern and the gain and phase in a grating lobe direction in the second radiation pattern.

For example, suppose that a variable indicating the gain and phase in the grating lobe direction in the first radiation pattern is $G_0$ and a variable indicating the gain and phase in the grating lobe direction in the second radiation pattern is $G_S$, the weighting coefficient w is represented as the following equation (7).

$$w = \frac{MG_0}{NG_s} \quad (7)$$

Upon specifying the weighting coefficient w, the signal combiner 35 uses the weighting coefficient w to combine the total sum of the digital received signals $S_1$ (t) and the total sum of the digital received signals $S_2$ (t) stored by the signal calculation storage 34 as represented in equation (8) shown below, and outputs a composite signal $S_3$.

$$S_3 = \sum_{t=1}^{M} S_1(t) - w \sum_{t=1}^{N} S_2(t) \quad (8)$$

where $S_1$ (t), $S_2$ (t), $S_3$, and w are complex numbers represented by $Ae^{j\varphi}$. The letter "A" represents an amplitude and φ represents a phase.

In equation (8), the signal arriving from a pointing direction is a signal close to the digital received signal $S_1$ (t) with a first term on a right side dominant.

On the other hand, the signal arriving from the grating lobe direction is canceled by the first term and a second term on the right side and becomes almost zero.

As a result, the signal arriving from the pointing direction is hardly influenced by the calculation of equation (8), but the gain of the signal arriving from the grating lobe direction is reduced.

As is clear from the above descriptions, according to the second embodiment, the signal calculation storing unit storage 34 is provided which, when a first radiation pattern is set by the radiation pattern controller 10, each time the digital signals I (t) and Q (t) are output from the A/D converters 27 and 28 of the signal detector 60, calculates a digital received signal $S_1$ (t) indicating the amplitude m (t) and phase φ (t) of the received signal of the array antenna 1 from the digital signals I (t) and Q (t) and stores the digital received signal $S_1$ (t), and also which, when a second radiation pattern is set by the radiation pattern controller 10, each time the digital signals I (t) and Q (t) are output from the A/D converters 27 and 28 of the signal detector 60, calculates a digital received signal $S_2$ (t) indicating the amplitude m (t) and phase φ (t) of the received signal of the array antenna 1 from the digital signals I (t) and Q (t) and stores the digital received signal $S_2$ (t), and it is configured that the signal combiner 35 specifies the weighting coefficient w for suppressing a grating lobe included in the composite signal obtained when combining the total sum of the M digital received signals $S_1$ (t) and the total sum of the N digital received signals $S_2$ (t) stored by the signal calculation storage 31, from the gain in a grading lobe direction in the first radiation pattern and the gain in a grating lobe direction in the second radiation pattern, and combines the total sum of the M digital received signals $S_1$ (t) and the total sum of the N digital received signals $S_2$ (t) stored by the signal calculation storage 31 by using the weighting coefficient w, thus allowing for an effect of suppressing the grating lobe without disposition of an auxiliary array. In addition, an effect of obtaining the received signal of the array antenna 1 even when the radio wave received by the array antenna 1 is weak can be allowed for.

Third Embodiment

In the first and second embodiments described above, a first radiation pattern and a second radiation pattern are set in an array antenna 1, but three or more types of radiation patterns may also be set in the array antenna 1.

Figure 11:
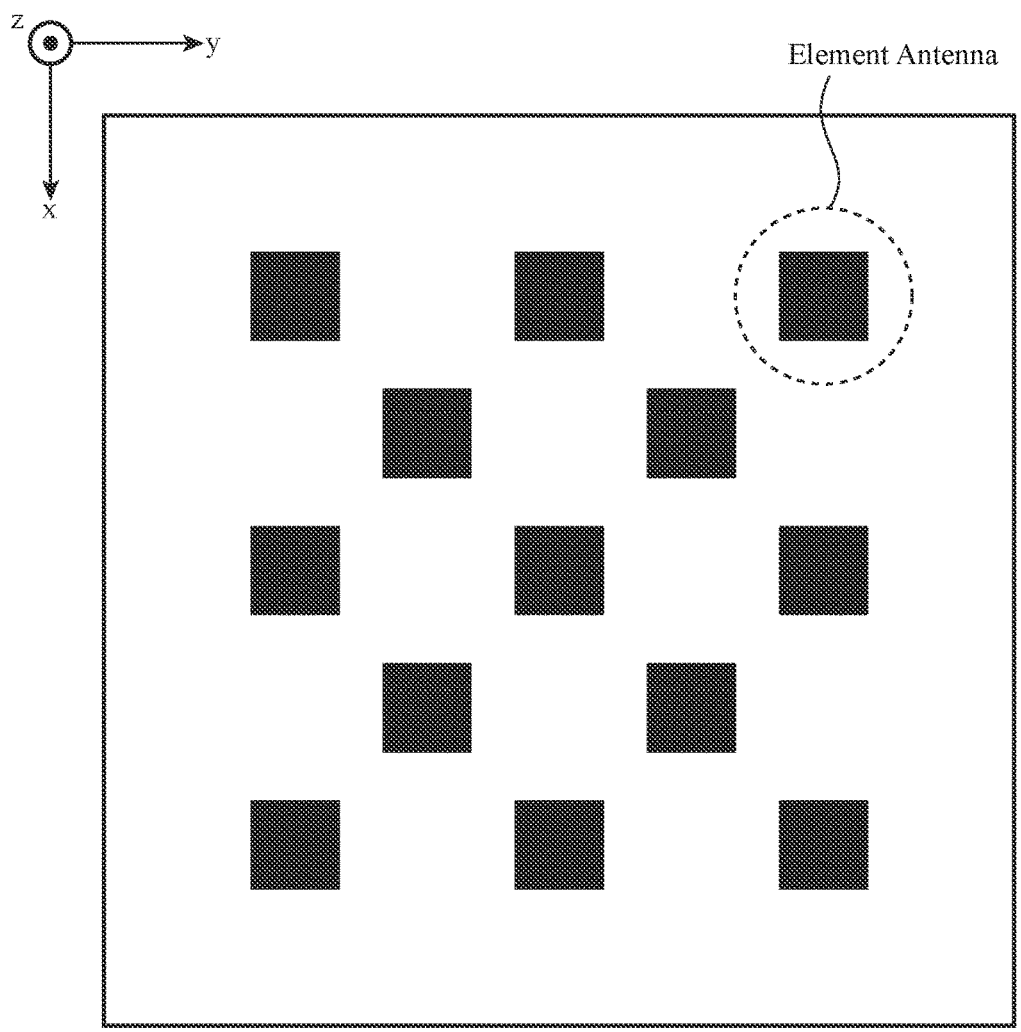
FIG. 11 is an explanatory view illustrating an exemplary arrangement of element antennas 2-1 to 2-N.
Figure 12:
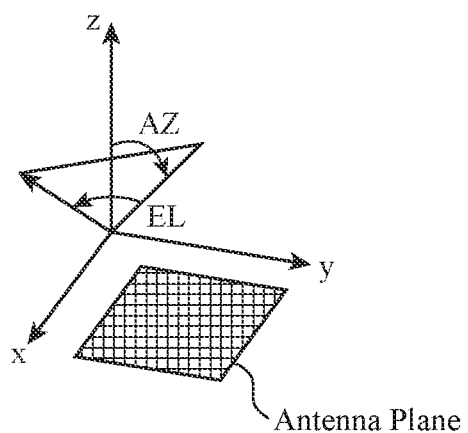
FIG. 12 is an explanatory diagram illustrating an antenna plane of an array antenna 1.

FIG. 11 is an explanatory view illustrating an exemplary arrangement of element antennas 2-1 to 2-N, and FIG. 12 is an explanatory diagram illustrating an antenna plane of the array antenna 1.

A configuration diagram of an antenna device according to a third embodiment of the present invention is the same as the configuration diagram of the antenna device of FIG. 1 in the first embodiment described above.

However, although the element antennas 2-1 to 2-N are illustrated to be arranged on a straight line in FIG. 1, in this third embodiment, they are two-dimensionally arranged on an xy plane as illustrated in FIG. 11. In the example of FIG. 11, 13 element antennas 2-1 to 2-13 are arranged.

The radiation pattern controller 10 sets (M+1) radiation patterns of the array antenna 1 having one pointing direction and M grading lobe directions (M is an integer equal to or larger than two) by changing the radiation patterns of the element antennas 2-1 to 2-N.

In the third embodiment, for the sake of simplicity of description, an example of setting three radiation patterns is described while setting M=2. However, this is merely an example, and four or more radiation patterns may also be set.

Figure 13:
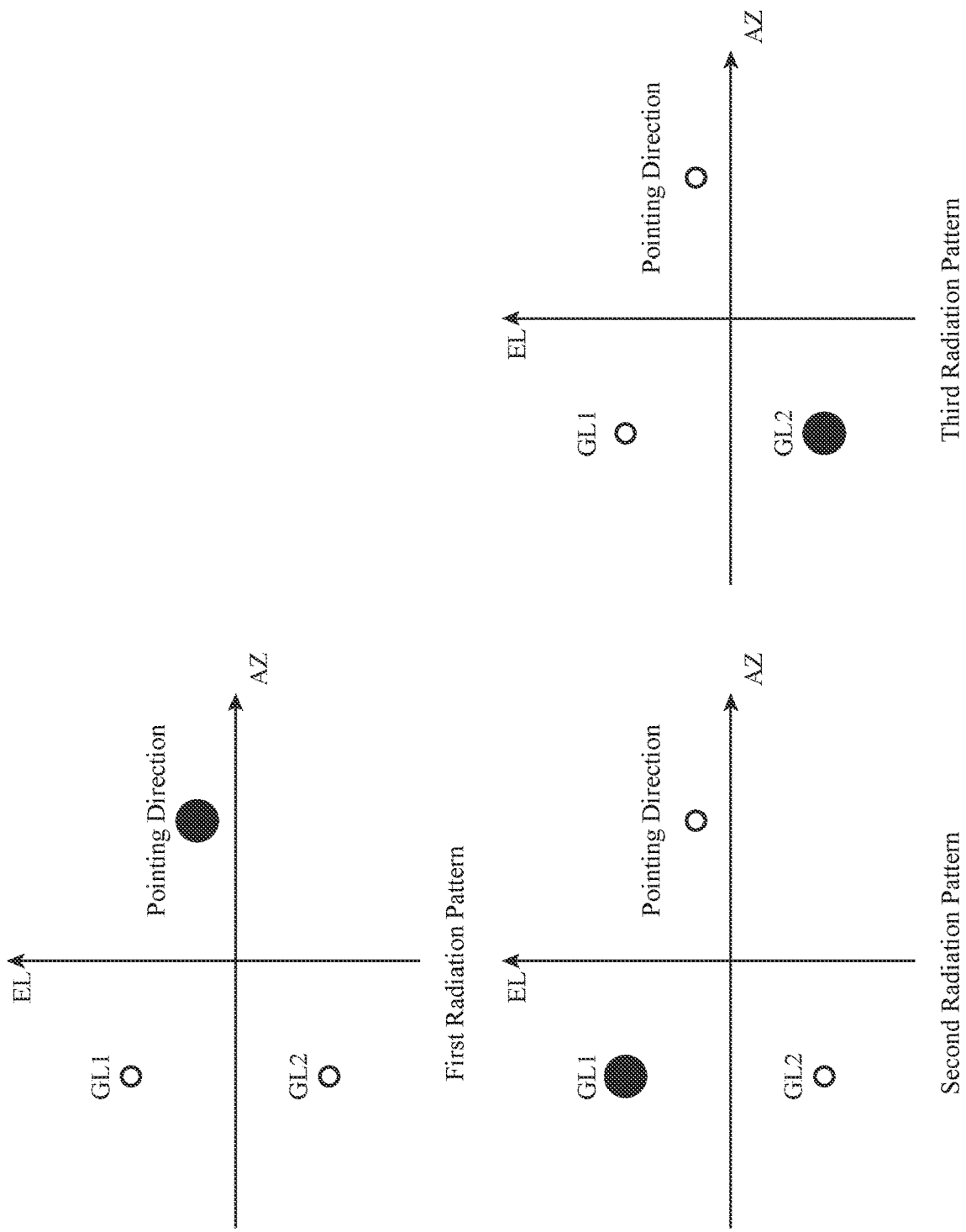
FIG. 13 illustrates explanatory graphs indicating intensities of gains in a pointing direction and a grating lobe direction in three radiation patterns set by a radiation pattern controller 10.

FIG. 13 illustrates explanatory graphs indicating intensities of gains in a pointing direction and in a grating lobe direction in three radiation patterns set by the radiation pattern controller 10.

In FIG. 13, GL1 and GL2 represent the grating lobe directions in a coordinate system of FIG. 12.

The gain in the pointing direction is higher than gains in GL1 and GL2 in the first radiation pattern, the gain in the pointing direction is lower than the gain in GL1 in the second radiation pattern, and the gain in the pointing direction is lower than the gain in GL2 in the third radiation pattern.

In this regard, the first to third radiation patterns of the array antenna 1 that include two grating lobe directions can be set as long as the element antennas 2-1 to 2-13 are configured to allow for switching among the radiation patterns including two grating lobe directions.

Each time digital signals are output from A/D converters 27 and 28 of a signal detector 20, a signal calculation storage 31 calculates a digital received signal indicating amplitude and a phase of the received signal of the array antenna 1 from the digital signals and stores the digital received signal as in the first embodiment described above.

In the third embodiment, when the first radiation pattern is set by the radiation pattern controller 10, a digital received signal $S_1$ indicating the amplitude and the phase of the received signal of the array antenna 1 is calculated from the received signal detected by the signal detector 20 and the digital received signal $S_1$ is stored, and when the second radiation pattern is set by the radiation pattern controller 10, a digital received signal $S_2$ indicating the amplitude and the phase of the received signal of the array antenna 1 is calculated from the received signal detected by the signal detector 20 and the digital received signal $S_2$ is stored.

Also, when the third radiation pattern is set by the radiation pattern controller 10, a digital received signal $S_3$ indicating the amplitude and the phase of the received signal of the array antenna 1 is calculated from the received signal detected by the signal detector 20 and the digital received signal $S_3$ is stored, A radiation pattern storage 32 stores the first, second and third radiation patterns set by the radiation pattern controller 10.

A signal combiner 33 performs processing to specify weighting coefficients $w_2$ and $w_3$ for suppressing a grating lobe included in a composite signal obtained when combining the digital received signal $S_1$, digital received signal $S_2$ and digital received signal $S_3$ stored by the signal calculation storage 31, from the gain in a grating lobe direction in the first radiation pattern, the gain in a grating lobe direction in the second radiation pattern, and the gain in a grating lobe direction in the third radiation pattern, and to combine the digital received signal $S_1$, digital received signal $S_2$ and digital received signal $S_3$ stored by the signal calculation storage 31 by using the weighting coefficients $w_2$ and $w_3$.

Next, operations will be described.

First, as in the first embodiment described above, the signal combiner 33 of the signal processor 30 outputs a command for setting the first radiation pattern to the radiation pattern controller 10.

Upon receiving the command for setting the first radiation pattern from the signal combiner 33 of the signal processor 30, the radiation pattern controller 10 sets the radiation pattern of the array antenna 1 to the first radiation pattern by changing the radiation patterns of the element antennas 2-1 to 2-13.

When the radiation pattern controller 10 sets the first radiation pattern, the signal detector 20 detects the received signal of the array antenna 1 and outputs digital signal I and Q as in the first embodiment.

Upon receiving the digital signals I and Q from the A/D converters 27 and 28 of the signal detector 20, the signal calculation storage 31 of the signal processor 30 calculates the digital received signal $S_1$ indicating the amplitude m and the phase φ of the received signal of the array antenna 1 from the digital signals I and Q as represented by equation (1) and (2) described above and stores the digital received signal $S_1$.

Next, the signal combiner 33 of the signal processor 30 outputs a command for setting the second radiation pattern to the radiation pattern controller 10.

Upon receiving the command for setting the second radiation pattern from the signal combiner 33 of the signal processor 30, the radiation pattern controller 10 sets the radiation pattern of the array antenna 1 to the second radiation pattern by changing the radiation patterns of the element antennas 2-1 to 2-13.

When the radiation pattern controller 10 sets the second radiation pattern, the signal detector 20 detects the received signal of the array antenna 1 and outputs the digital signals I and Q.

Upon receiving the digital signals I and Q from the A/D converters 27 and 28 of the signal detector 20, the signal calculation storage 31 of the signal processor 30 calculates the digital received signal $S_2$ indicating the amplitude m and the phase φ of the received signal of the array antenna 1 from the digital signals I and Q as represented by equations (1) and (2) described above and stores the digital received signal $S_2$.

Next, the signal combiner 33 of the signal processor 30 outputs a command for setting the third radiation pattern to the radiation pattern controller 10.

Upon receiving the command for setting the third radiation pattern from the signal combiner 33 of the signal processor 30, the radiation pattern controller 10 sets the radiation pattern of the array antenna 1 to the third radiation pattern by changing the radiation patterns of the element antennas 2-1 to 2-13.

When the radiation pattern controller 10 sets the third radiation pattern, the signal detector 20 detects the received signal of the array antenna 1 and outputs the digital signals I and Q.

Upon receiving the digital signals I and Q from the A/D converters 27 and 28 of the signal detector 20, the signal calculation storage 31 of the signal processor 30 calculates the digital received signal $S_3$ indicating the amplitude m and the phase φ of the received signal of the array antenna 1 from the digital signals I and Q and stores the digital received signal $S_3$ as represented by equations (1) and (2) described above The signal combiner 33 of the signal processor 30 refers to the first radiation pattern, second radiation pattern and third radiation pattern stored in the radiation pattern storage 32 to confirm the gain and phase in the grating lobe direction in the first radiation pattern, the gain and phase in the grating lobe direction in the second radiation pattern, and the gain and phase in the grating lobe direction in the third radiation pattern.

weighting coefficients $w_2$ and $w_3$ are specified for suppressing a grating lobe included in the composite signal obtained when the digital received signal $S_1$, digital received signal $S_2$ and digital received signal $S_3$ stored by the signal calculation storage 31 are combined, from the gain and phase in a grating lobe direction in the first radiation pattern, the gain and phase in a grating lobe direction in the second radiation pattern, and the gain and phase in a grating lobe direction in the third radiation pattern.

For example, when the gain in GL1 in the first radiation pattern is $G_1$ (GL1), the gain in GL2 in the first radiation pattern is $G_1$ (GL2), the gain in GL1 in the second radiation pattern is $G_2$ (GL1), the gain in GL2 in the second radiation pattern is $G_2$ (GL2), the gain in GL1 in the third radiation pattern is $G_3$ (GL1), and the gain in GL2 in the third radiation pattern is $G_3$ (GL2), the weighting coefficients $w_2$ and $w_3$ are represented in the following equation (9).

$$\begin{bmatrix} w_2 \\ w_4 \end{bmatrix} = -\begin{bmatrix} G_2(GL1) & G_3(GL1) \\ G_2(GL2) & G_3(GL2) \end{bmatrix}^{-1} \begin{bmatrix} G_1(GL1) \\ G_1(GL2) \end{bmatrix} \quad (9)$$

where a matrix at the left in the right side of equation (9) is an inverse matrix corresponding to a two-by-two first matrix having as components the gain in GL1 in the second radiation pattern $G_2$ (GL1), the gain in GL2 in the second radiation pattern $G_2$ (GL2), the gain in GL1 in the third radiation pattern $G_3$ (GL1), and the gain in GL2 in the third radiation pattern $G_3$ (GL2), and a matrix at the right in the right side of equation (9) is a two-by-one second matrix having as components the gain in GL1 in the first radiation pattern $G_1$ (GL1) and the gain in GL2 in the first radiation pattern $G_1$ (GL2).

Upon specifying the weighting coefficients $w_2$ and $w_3$, the signal combiner 33 combines the digital received signal $S_1$, digital received signal $S_2$, and digital received signal $S_3$ stored by the signal calculation storage 31 by using the weighting coefficients $w_2$ and $w_3$ as represented in equation (10) shown below, and outputs a composite signal $S_4$.

$$S_4 = S_1 + w_2 S_2 + w_3 S_3 \quad (10)$$

where $S_1$, $S_2$, $S_3$, $S_4$, $w_2$, and $w_3$ are complex numbers represented by $Ae^{j\varphi}$. The letter "A" represents an amplitude and $\varphi$ represents a phase.

In equation (10), the signal arriving from the pointing direction is a signal close to the digital received signal $S_1$ with a first term on the right side dominant.

On the other hand, the signal arriving from the grating lobe direction is canceled by the first term, a second term, and a third term on the right side and becomes almost zero.

As a result, the signal arriving from the pointing direction is hardly influenced by the calculation of equation (10), but the gain of the signal arriving from the grating lobe direction is reduced.

As is clear from the above descriptions, according to the third embodiment, it is configured such that the signal combiner 33 specifies weighting coefficients $w_2$ and $w_3$ for suppressing a grating lobe included in the composite signal S obtained when combining the digital received signal $S_1$, digital received signal $S_2$ and digital received signal $S_3$ stored by the signal calculation storage 31, from the gain in a grating lobe direction in the first radiation pattern, the gain in a grating lobe direction in the second radiation pattern, and the gain in a grating lobe direction in the third radiation pattern, and combines the digital received signal $S_1$, digital received signal $S_2$, and digital received signal $S_3$ stored by the signal calculation storage 31 by using the weighting coefficients $w_2$ and $w_3$, thus allowing for an effect of suppressing the grating lobe without disposition of an auxiliary array antenna.

Although the example in which the number of grating lobe directions in each radiation pattern of the array antenna 1 is two is described in this third embodiment, as long as the radiation pattern in which the element antennas 2-1 to 2-N include three or more grating lobe directions may be set, it is possible to set the radiation pattern of the array antenna 1 including three or more grating lobe directions.

Therefore, even when the number of grating lobe directions in each radiation pattern of the array antenna 1 is three or more, the third embodiment may be applied.

Fourth Embodiment

In the first to third embodiments described above, a signal detector 20 or 60 detects digital signals I and Q or I (t) and Q (t) from a received signal of an array antenna 1 and a signal calculation storage 31 or 34 of a signal processor 30 calculates a digital received signal indicating amplitude m or m (t) and a phase $\varphi$ or $\varphi$ (t) of the received signal of the array antenna 1 from the digital signals I and Q or I (t) and Q (t) to store; however, it is also possible that the signal detector converts the received signal of the array antenna 1 into the digital signal and outputs the digital signal, and the signal storage of the signal processor 30 stores the digital signal.

Figure 14:
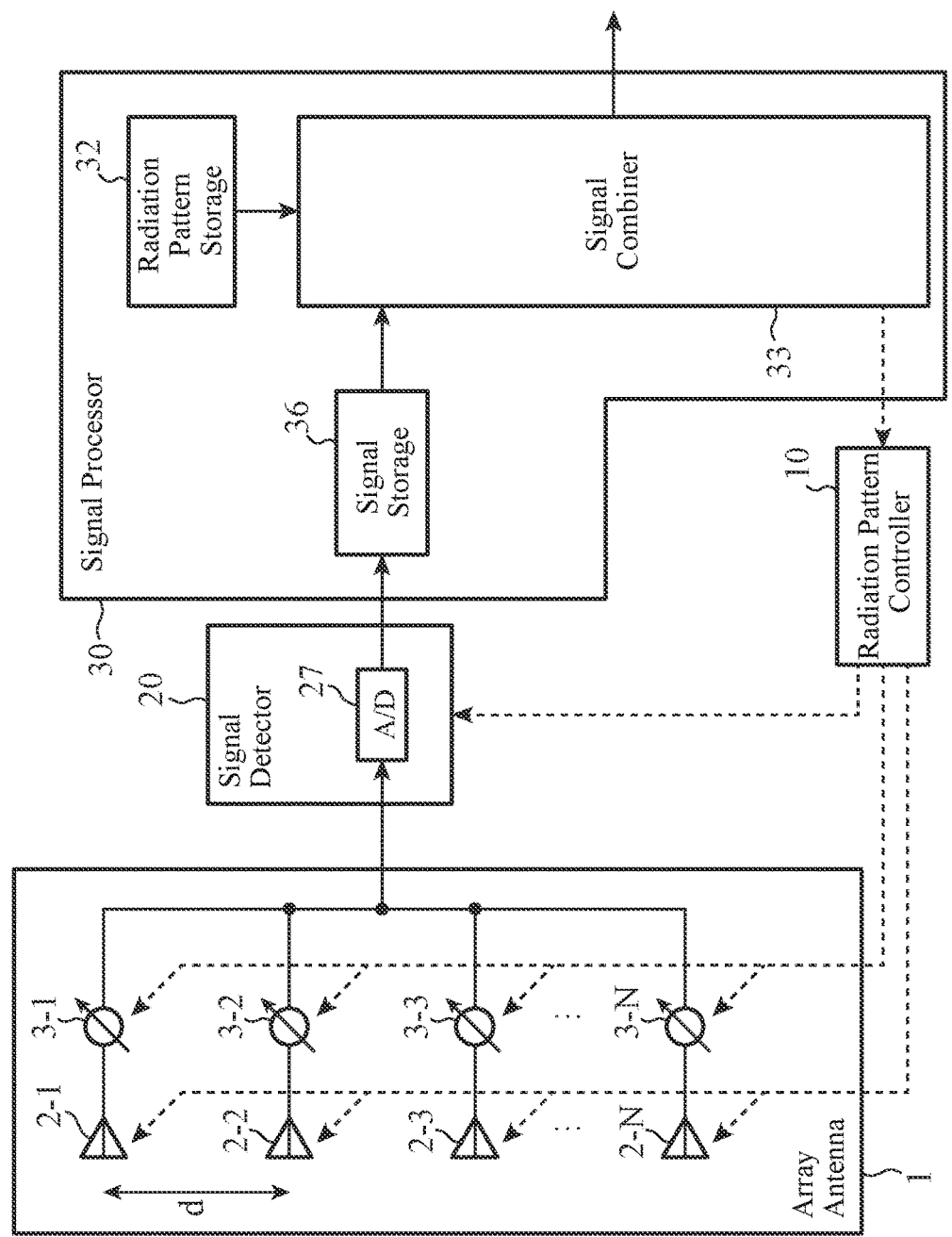
FIG. 14 is a configuration diagram illustrating an antenna device according to a fourth embodiment of the present invention.

FIG. 14 is a configuration diagram illustrating an antenna device according to a fourth embodiment of the present invention; in FIG. 14, the same reference sign as that in FIG. 1 represents the same or corresponding parts, so that the description thereof is omitted.

In the fourth embodiment, the signal detector 20 includes only an A/D converter 27, and the A/D converter 27 converts the received signal of the array antenna 1 into the digital signal and outputs the digital signal to the signal processor 30.

The signal processor 30 including a signal storage 36, a radiation pattern storage 32, and a signal combiner 33 performs processing to combine the received signals detected by the signal detector 20 when each radiation pattern of the array antenna 1 is set.

The signal storage 36, which is implemented for example by a storage device 42 shown in FIG. 2, stores the digital signal each time the digital signal is output from the A/D converter 27 of the signal detector 20.

In the example of FIG. 14, it is assumed that each of the signal storage 36, the radiation pattern storage 32, and the signal combiner 33 which are components of the signal processor 30 is comprised of dedicated hardware. Alternatively, the signal processor 30 may also be comprised of a computer.

In the case where the signal processor 30 is comprised of a computer, the signal storage 36 can be configured on the RAM 51 of the computer illustrated in FIG. 3, the radiation pattern storage 32 can be configured on a RAM 51 or a ROM 52, a program describing the contents for operations of the signal combiner 33 can be stored in the ROM 52, and a processor 53 of the computer illustrated in FIG. 3 can execute the program stored in the ROM 52.

Next, operations will be described.

First, as in the first embodiment described above, the signal combiner 33 of the signal processor 30 outputs a command for setting the first radiation pattern to the radiation pattern controller 10.

Upon receiving the command for setting of the first radiation pattern from the signal combiner 33 of the signal processor 30, the radiation pattern controller 10 sets the radiation pattern of the array antenna 1 to the first radiation pattern by changing radiation patterns of element antennas 2-1 to 2-N as in the above-described first embodiment.

When the radiation pattern controller 10 sets the first radiation pattern, the A/D converter 27 of the signal detector 20 converts the received signal of the array antenna 1 into the digital signal and outputs the digital signal to the signal processor 30.

Upon receiving the digital signal from the A/D converter 27 of the signal detector 20, the signal storage 36 of the signal processor 30 stores the digital signal.

Hereinafter, the digital signal stored by the signal storage 36 is set as a digital received signal $S_1$, and the digital received signal $S_1$ corresponds to amplitude of the received signal of the array antenna 1.

Next, as in the first embodiment described above, the signal combiner 33 of the signal processor 30 outputs a command for setting a second radiation pattern to the radiation pattern controller 10.

Upon receiving the command for setting the second radiation pattern from the signal combiner 33 of the signal processor 30, the radiation pattern controller 10 sets the radiation pattern of the array antenna 1 to the second radiation pattern by changing the radiation patterns of the element antennas 2-1 to 2-N as in the above-described first embodiment.

When the radiation pattern controller 10 sets the second radiation pattern, the A/D converter 27 of the signal detector 20 converts the received signal of the array antenna 1 into the digital signal and outputs the digital signal to the signal processor 30.

Upon receiving the digital signal from the A/D converter 27 of the signal detector 20, the signal storage 36 of the signal processor 30 stores the digital signal.

Hereinafter, the digital signal stored by the signal storage 36 is set as a digital received signal $S_2$, and the digital received signal $S_2$ corresponds to the amplitude of the received signal of the array antenna 1.

The signal combiner 33 of the signal processor 30 refers to the first radiation pattern and second radiation pattern stored in the radiation pattern storage 32 to confirm a gain in a grating lobe direction in the first radiation pattern and a gain in the grating lobe direction in the second radiation pattern.

A weighting coefficient w is specified for suppressing a grating lobe included in a composite signal obtained when combining the digital received signal $S_1$ and digital received signal $S_2$ stored by the signal calculation storage 31, from the gain in a grating lobe direction in the first radiation pattern and the gain in a grating lobe direction in the second radiation pattern.

For example, if a variable indicating the gain in the grating lobe direction in the first radiation pattern is $G_0$ and a variable indicating the gain in the grating lobe direction in the second radiation pattern is $G_S$, the weighting coefficient w is represented as the following equation (11).

$$w = \frac{G_0}{G_S} \quad (11)$$

Unlike the above-described first embodiment, $G_0$ and $G_S$ represent only the gain in the grating lobe direction and do not include phase information.

Upon specifying the weighting coefficient w, the signal combiner 33 combines the digital received signal $S_1$ and digital received signal $S_2$ stored by the signal calculation storage 31 by using the weighting coefficient w as represented by equation (12) shown below, and outputs a composite signal $S_3$.

$$S_3 = S_1 - wS_2 \quad (12)$$

where, unlike in the above-described first embodiment, $S_1$, $S_2$, $S_3$, and w represent only amplitudes and do not include the phase information.

In equation (12), the signal arriving from the pointing direction is a signal close to the digital received signal $S_1$ with a first term on a right side dominant.

On the other hand, the signal arriving from the grating lobe direction is canceled by the first term and a second term on the right side and becomes almost zero.

As a result, the signal arriving from the pointing direction is hardly influenced by the calculation of equation (12), but the gain of the signal arriving from the grating lobe direction is reduced.

As is apparent from the above descriptions, according to the fourth embodiment, even when the signal detector 20 has a simplified configuration in which only the A/D converter 27 is mounted, there is an effect that the grading lobe may be suppressed without arranging an auxiliary array antenna.

Although the example in which the signal detector 20 including only the A/D converter 27 is applied to the antenna device of the first embodiment described above is illustrated in the fourth embodiment, it is also possible that the signal detector 20 including only the A/D converter 27 is applied to the antenna device of the above-described second and third embodiments.

Fifth Embodiment

In the above-described first to fourth embodiments, a radiation pattern controller 10 changes phase shift amounts of phase shifters 3-1 to 3-N in a case of changing a pointing direction. Alternatively, a pointing direction can be set to a desired direction by performing digital beam forming on received signals of element antennas 2-1 to 2-N.

Figure 15:
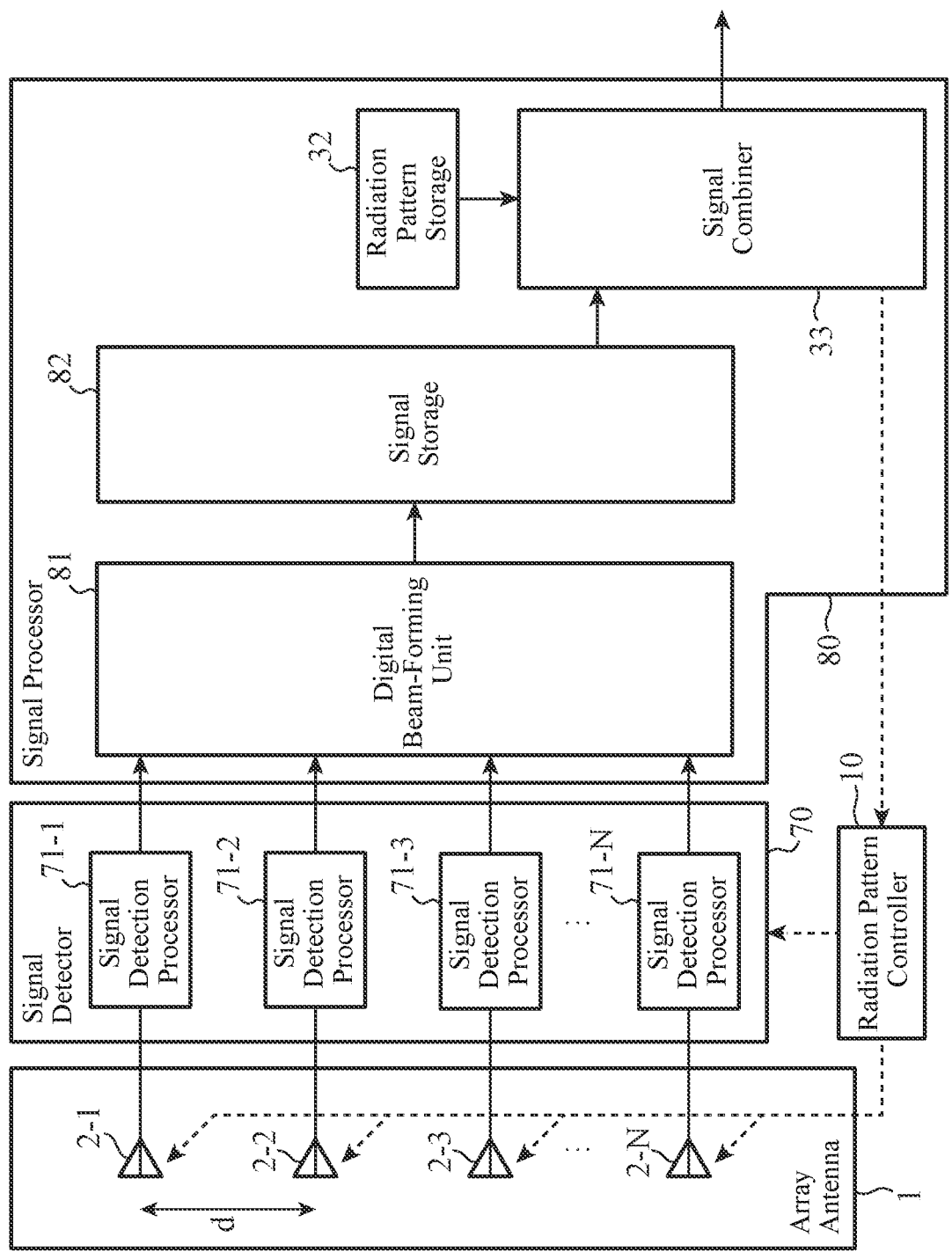
FIG. 15 is a configuration diagram illustrating an antenna device according to a fifth embodiment of the present invention.
Figure 16:
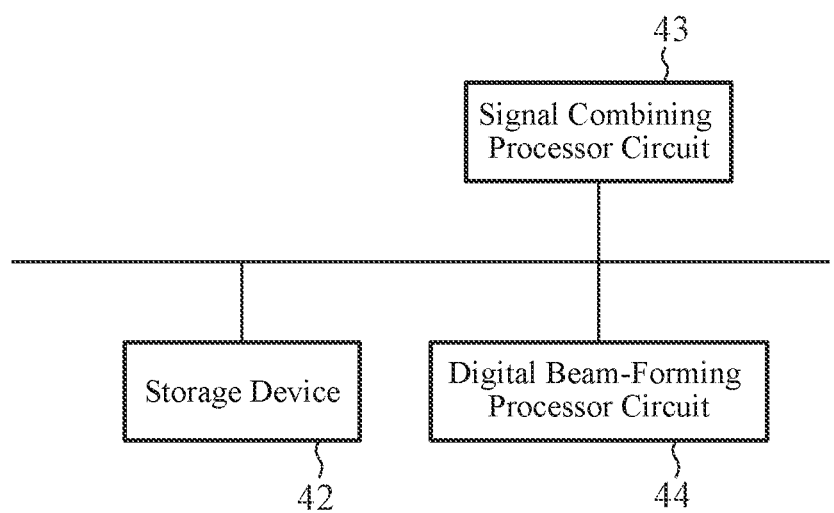
FIG. 16 is a hardware configuration diagram of a signal processor 80 in the antenna device according to the fifth embodiment of the present invention.

FIG. 15 is a configuration diagram illustrating an antenna device according to a fifth embodiment of the present invention, and FIG. 16 is a hardware configuration diagram of a signal processor 80 in the antenna device according to the fifth embodiment of the present invention.

In FIGS. 15 and 16, the same reference signs as those in FIG. 1 and FIG. 2 represent the same or corresponding parts, so that the description thereof is omitted.

A signal detector 70 includes N signal detection processors 71-1 to 71-N.

Each time a new radiation pattern is set by the radiation pattern controller 10, the signal detection processors 71-1 to 71-N detect the received signal of the element antennas 2-1 to 2-N.

That is, when a first radiation pattern is set by the radiation pattern controller 10, the signal detection processors 71-1 to 71-N detect an I signal and a Q signal which are orthogonal signals, from the received signal of the element antennas 2-1 to 2-N, and when a second radiation pattern is set by the radiation pattern controller 10, they detect the I signal and the Q signal which are orthogonal signals, from the received signal of the element antennas 2-1 to 2-N.

The signal processor 80 includes a digital beam forming unit 81, a signal storage 82, a radiation pattern storage 32, and a signal combiner 33.

The digital beam forming unit 81, which is implemented for example by a digital-beam-forming processor circuit 44 comprised of a semiconductor integrated circuit incorporating a CPU, a one-chip microcomputer or another similar device, performs digital beam forming on digital received signals calculated by the signal detection processors 71-1 to 71-N, and performs processing to calculate a digital received signal indicating an amplitude and phase of the received signal of an array antenna 1.

The signal storage 82, which is implemented for example by a storage device 42, stores the digital received signal calculated by the digital beam forming unit 81.

In an example of FIG. 15, each of the digital beam forming unit 81, the signal storage 82, the radiation pattern storage 32, and the signal combiner 33, which are components of the signal processor 80, is assumed to be comprised of dedicated hardware. Alternatively, the signal processor 80 may also be comprised of a computer.

In the case where the signal processor 80 is comprised of a computer, the signal storage 82 can be configured on a RAM 51 of the computer illustrated in FIG. 3, the radiation pattern storage 32 can be configured on the RAM 51 or a ROM 52, a program describing the contents for operations of the digital beam forming unit 81 and the signal combiner 33 can be stored in the ROM 52, and a processor 53 of the computer illustrated in FIG. 3 can execute the program stored in the ROM 52.

Figure 17:
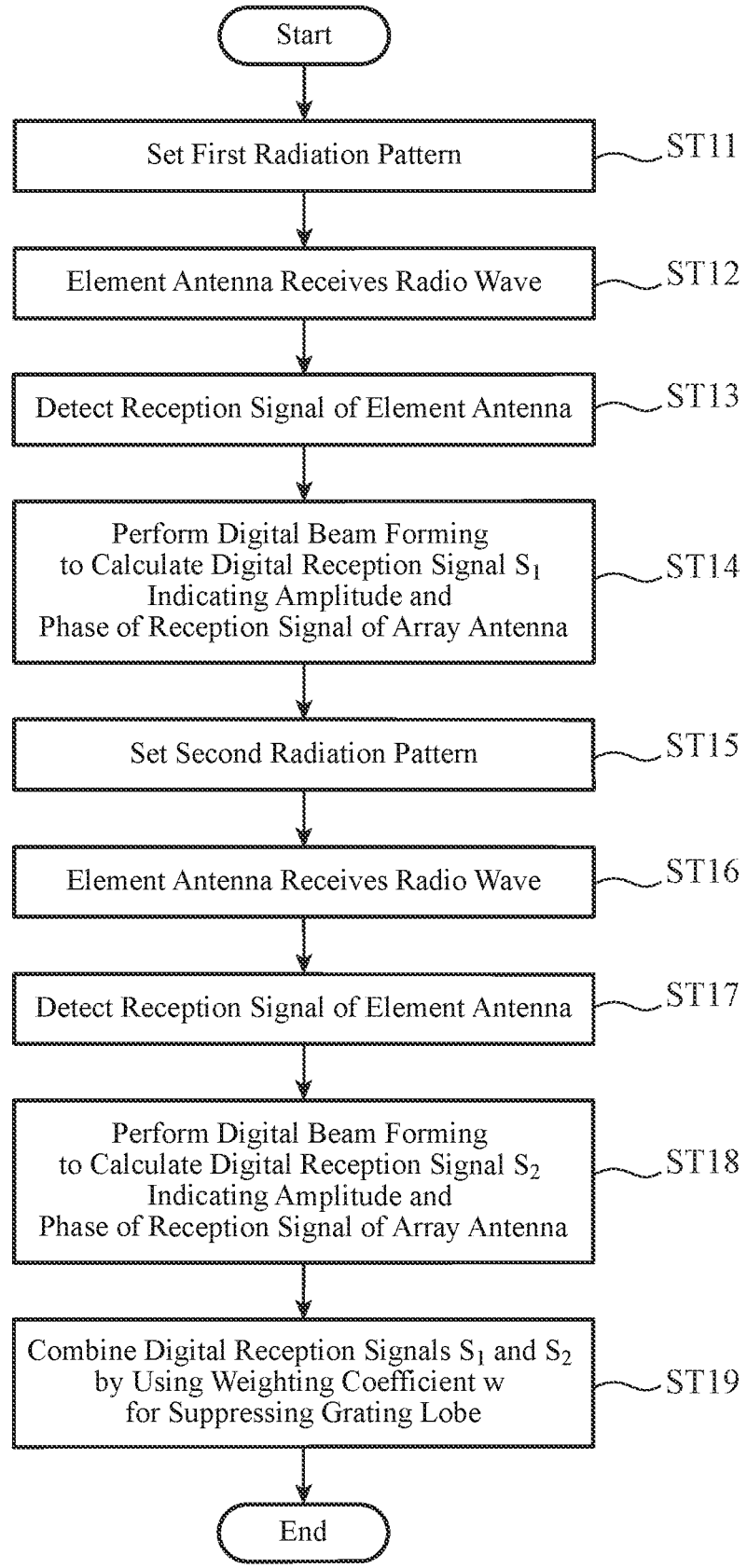
FIG. 17 is a flowchart illustrating a method for reducing a grating lobe which is a processing content of the antenna device according to the fifth embodiment of the present invention.

FIG. 17 is a flowchart illustrating a method for reducing a grating lobe which is the processing content of the antenna device according to the fifth embodiment of the present invention.

Next, operations will be described.

First, as in the first embodiment described above, the signal combiner 33 of the signal processor 80 outputs a command for setting the first radiation pattern to the radiation pattern controller 10.

Upon receiving the command for setting the first radiation pattern from the signal combiner 33 of the signal processor 80, the radiation pattern controller 10 sets the radiation pattern of the array antenna 1 to the first radiation pattern by changing radiation patterns of the element antennas 2-1 to 2-N as in the above-described first embodiment (step ST11 in FIG. 17).

The element antennas 2-1 to 2-N of the array antenna 1 receive radio waves arriving when the radiation pattern controller 10 sets the first radiation pattern, and output the received signals to the signal detector 70 (step ST12).

When the first radiation pattern is set by the radiation pattern controller 10, the signal detection processors 71-1 to 71-N of the signal detector 70 detect the received signal of the element antennas 2-1 to 2-N (step ST13).

That is, the signal detection processors 71-1 to 71-N having the configuration similar to that of the signal detector 20 of FIG. 1 obtains the digital signal I and the digital signal Q which are orthogonal signals, from the received signal of the element antennas 2-1 to 2-N.

Then, the signal detection processors 71-1 to 71-N calculate the digital received signal indicating an amplitude m and phase $\varphi$ of the received signal of the element antennas 2-1 to 2-N, from the digital signals I and Q.

The processing to calculate the digital received signal from the digital signals I and Q is similar to the processing in which a signal calculation storage 31 of FIG. 1 calculates the digital received signal from the digital signals I and Q.

When the signal detection processors 71-1 to 71-N calculate the digital received signal indicating the amplitude m and the phase $\varphi$ of the received signal of the element antennas 2-1 to 2-N, the digital beam forming unit 81 of the signal processor 80 performs the digital beam forming on the N digital received signals in order to set the pointing direction in the first radiation pattern to a desired direction and calculates a digital received signal $S_1$ indicating the amplitude and the phase of the received signal of the array antenna 1 in the first radiation pattern (step ST14).

The signal storage 82 stores the digital received signal $S_1$ calculated by the digital beam forming unit 81.

Meanwhile, the digital beam forming adds the phase to the N digital received signals by digital signal processing, and since the digital beam forming is a well-known technology, the detailed description thereof is omitted.

Next, as in the first embodiment described above, the signal combiner 33 of the signal processor 80 outputs a command for setting a second radiation pattern to the radiation pattern controller 10.

Upon receiving the command for setting the second radiation pattern from the signal combiner 33 of the signal processor 80, the radiation pattern controller 10 sets the radiation pattern of the array antenna 1 to the second radiation pattern by changing the radiation patterns of the element antennas 2-1 to 2-13 as in the above-described first embodiment (step ST15).

The element antennas 2-1 to 2-N of the array antenna 1 receive the radio waves arriving when the radiation pattern controller 10 sets the second radiation pattern, and outputs the received signals to the signal detector 70 (step ST16).

When the second radiation pattern is set by the radiation pattern controller 10, the signal detection processors 71-1 to 71-N of the signal detector 70 detect the received signal of the element antennas 2-1 to 2-N (Step ST17).

That is, the signal detection processors 71-1 to 71-N having the configuration similar to that of the signal detector 20 of FIG. 1 obtains the digital signal I and the digital signal Q which are orthogonal signals, from the received signal of the element antennas 2-1 to 2-N.

Then, the signal detection processors 71-1 to 71-N calculate the digital received signal indicating amplitude m and a phase $\varphi$ of the received signal of the element antennas 2-1 to 2-N from the digital signals I and Q.

When the signal detection processors 71-1 to 71-N calculate the digital received signal indicating the amplitude m and the phase $\varphi$ of the received signal of the element antennas 2-1 to 2-N, the digital beam forming unit 81 of the signal processor 80 performs the digital beam forming on the N digital received signals in order to set the pointing direction in the second radiation pattern to a desired direction and calculates a digital received signal $S_2$ indicating the amplitude and the phase of the received signal of the array antenna 1 in the second radiation pattern (step ST18).

The signal storage 82 stores the digital received signal $S_2$ calculated by the digital beam forming unit 81.

The digital beam forming sets the pointing direction in the first and second radiation patterns. It goes without saying that one pointing direction may be set by performing the digital beam forming once, but it is also possible to simultaneously set a plurality of pointing directions by performing the digital beam forming once.

The signal combiner 33 of the signal processor 80 refers to the first radiation pattern and second radiation pattern stored in the radiation pattern storage 32 to confirm the gain and phase in the grating lobe direction in the first radiation pattern, and the gain and phase in the grating lobe direction in the second radiation pattern as in the first embodiment.

From the gain and phase in the grating lobe direction in the first radiation pattern and the gain and phase in the grating lobe direction in the second radiation pattern, a weighting coefficient w is specified for suppressing a grating lobe included in a composite signal obtained when the digital received signal $S_1$ and digital received signal $S_2$ stored by the signal storage 82 are combined.

Upon specifying the weighting coefficient w, the signal combiner 33 combines the digital received signal $S_1$ and digital received signal $S_2$ stored by the signal storage 82 by using the weighting coefficient w as represented by equation (4) described above, and outputs a composite signal $S_3$ (step ST19).

In equation (4), the signal arriving from the pointing direction is a signal close to the digital received signal $S_1$ with a first term on a right side dominant.

On the other hand, the signal arriving from the grating lobe direction is canceled by the first term and a second term on the right side and becomes almost zero.

As a result, the signal arriving from the pointing direction is hardly influenced by the calculation of equation (4), but the gain of the signal arriving from the grating lobe direction is reduced.

As is clear from the above descriptions, according to the fifth embodiment, it is configured such that the digital beam forming unit 81 which calculates the digital received signals $S_1$ and $S_2$ indicating the amplitude and the phase of the received signal of the array antenna 1 by performing the digital beam forming on the digital received signals calculated by the signal detection processors 71-1 to 71-N and the signal storage 82 which stores the digital received signals $S_1$ and $S_2$ calculated by the digital beam forming unit 81 are provided, and the signal combiner 33 specifies the weighting coefficient w for suppressing the grating lobe included in the composite signal $S_3$ obtained when combining the digital received signal $S_1$ and digital received signal $S_2$ stored by the signal storage 82, from the gain in a grating lobe direction in the first radiation pattern and the gain in a grating lobe direction in the second radiation pattern, and combines the digital received signal $S_1$ and digital received signal $S_2$ stored by the signal storage 82 by using the weighting coefficient w, thus allowing for an effect of suppressing the grating lobe without disposition of an auxiliary array antenna.

Meanwhile, in the invention of the present application, embodiments may be freely combined, an arbitrary component of each embodiment may be modified, or an arbitrary component may be omitted in each embodiment without departing from the scope of the invention.

INDUSTRIAL APPLICABILITY

The antenna device and the method for reducing the grating lobe according to the present invention are suitable for suppressing the gain in the grating lobe direction included in the received signal of the array antenna.

REFERENCE SIGNS LIST

1: Array antenna; 2-1 to 2-N: Element antenna; 3-1 to 3-N: Phase shifter; 10: Radiation pattern controller; 20: Signal detector; 21: Oscillator; 22: 90-degree phase shifter; 23, 24: Mixer; 25, 26: LPF; 27, 28: A/D converter; 30: Signal processor; 31, 34: Signal calculation storage (signal storage); 32: Radiation pattern storage; 33, 35: Signal combiner; 36: Signal storage; 41: Signal storage processor circuit; 42: Storage device; 43: Signal combining processor circuit; 44: Digital-beam-forming processor circuit; 51: RAM; 52: ROM; 53: Processor; 54: Input/output interface; 60: Signal detector; 70: Signal detector; 71-1 to 71-N: Signal detection processor; 80: Signal processor; 81: Digital beam forming unit; and 82: Signal storage.

The invention claimed is:

1. An antenna device comprising:
an array antenna including a plurality of element antennas which are configured to allow for switching among radiation patterns;
a radiation pattern controller to change radiation patterns of the plurality of element antennas thereby to set a plurality of radiation patterns of the array antenna at different times, one of the radiation patterns indicating a gain in a pointing direction that is higher than a gain in a grating lobe direction, another of the radiation patterns indicating a gain in the pointing direction that is lower than a gain in the grating lobe direction;
a signal detector to detect a received signal of the array antenna each time the radiation pattern of the array antenna is newly set by the radiation pattern controller to the one or the other of the radiation patterns; and
a signal processor to specify a weighting coefficient for suppressing a grating lobe included in a composite signal obtained when combining received signals detected by the signal detector when the one and the other of the radiation patterns of the array antenna are respectively set at the different times, from respective gains in a grating lobe direction in the one and the other of the radiation patterns of the array antenna which are set by the radiation pattern controller, and to combine the received signals respectively detected by the signal detector during the different times when the one and the other of the radiation patterns of the array antenna are respectively set, by using the weighting coefficient,
wherein each of the one and the other of the radiation patterns of the array antenna is set using the same plurality of element antennas.

2. The antenna device according to claim 1, wherein the signal processor includes:
a signal storage to store a received signal each time the received signal is detected by the signal detector; and
a signal combiner to specify one or more weighting coefficients for suppressing a grating lobe included in a composite signal obtained when combining a plurality of received signals stored by the signal storage, from gains in a grating lobe direction in radiation patterns of the array antenna which are set by the radiation pattern controller, and to combine received signals stored by the signal storage, by using the one or more weighting coefficients.

3. An antenna device comprising:
an array antenna including a plurality of element antennas which are configured to allow for switching among radiation patterns;
a radiation pattern controller to change radiation patterns of the plurality of element antennas thereby to set a radiation pattern of the array antenna;

a signal detector to detect a received signal of the array antenna each time the radiation pattern of the array antenna is newly set by the radiation pattern controller; and a signal processor to specify one or more weighting coefficients for suppressing a grating lobe included in a composite signal obtained when combining received signals detected by the signal detector when respective radiation patterns of the array antenna are set, from gains in a grating lobe direction in radiation patterns of the array antenna which are set by the radiation pattern controller, and to combine the received signals detected by the signal detector when the respective radiation patterns of the array antenna are set, by using the one or more weighting coefficients, wherein:

the radiation pattern controller sets, for the array antenna, a first radiation pattern indicating a gain in a pointing direction that is higher than a gain in a grating lobe direction, and sets, for the array antenna, a second radiation pattern indicating a gain in a pointing direction that is lower than a gain in a grating lobe direction;

a signal storage in the signal processor stores a received signal detected by the signal detector when the first radiation pattern is set, and stores a received signal detected by the signal detector when the second radiation pattern is set; and a signal combiner in the signal processor specifies one or more weighting coefficients for suppressing a grating lobe included in a composite signal obtained when combining two received signals stored by the signal storage, from a gain in a grating lobe direction in the first radiation pattern and a gain in a grating lobe direction in the second radiation pattern, and combines the two received signals by using the one or more weighting coefficients.

4. The antenna device according to claim 3, wherein:
the signal storage stores, as first received signals, a plurality of received signals detected two or more times by the signal detector when the first radiation pattern is set by the radiation pattern controller, and stores, as second received signals, a plurality of received signals detected two or more times by the signal detector when the second radiation pattern is set by the radiation pattern controller; and the signal combiner specifies one or more weighting coefficients for suppressing a grating lobe included in a composite signal obtained when combining a total sum of first received signals and a total sum of second received signals which are stored by the signal storage, from a gain in a grating lobe direction in the first radiation pattern and a gain in a grating lobe direction in the second radiation pattern, and combines the total sum of the first received signals and the total sum of the second received signals by using the one or more weighting coefficients.

5. The antenna device according to claim 2, wherein:
the radiation pattern controller sets, for the array antenna, a first radiation pattern indicating a gain in a pointing direction that is higher than gains in M grating lobe directions where M is an integer equal to or larger than two, and sets, for the array antenna, second to (M+1)-th radiation patterns each indicating a gain in a pointing direction that is lower than a gain in an m-th grating lobe direction among the M grating lobe directions where m is an integer equal to or larger than one, and equal to or less than M;

the signal storage stores a received signal detected by the signal detector when the first radiation pattern is set, and stores received signals detected by the signal detector when the second to (M+1)-th radiation patterns are set; and the signal combiner specifies one or more weighting coefficients for suppressing a grating lobe included in a composite signal obtained when combining all received signals stored by the signal storage, from a gain in a grating lobe direction in the first radiation pattern and gains in a grating lobe direction in the second to (M+1)-th radiation patterns, and combines all the received signals by using the one or more weighting coefficients.

6. The antenna device according to claim 5, wherein the signal combiner calculates a product of an inverse matrix corresponding to a first matrix having as components gains in M grating lobe directions in the second to (M+1)-th radiation patterns, and a second matrix having as components gains in M grating lobe directions in the first radiation pattern, thereby to calculate weighting coefficients for suppressing a grating lobe included in the composite signal.

7. The antenna device according to claim 2, wherein:
the signal detector detects an I signal and a Q signal which are orthogonal signals, from the received signal of the array antenna;

the signal storage calculates a digital received signal indicating an amplitude and phase of the received signal of the array antenna from the I signal and the Q signal each time the I signal and the Q signal are detected by the signal detector, and stores the digital received signal; and the signal combiner specifies one or more weighting coefficients for suppressing a grating lobe included in a composite digital received signal obtained when combining digital received signals stored by the signal storage, from gains in a grating lobe direction in the radiation patterns set by the radiation pattern controller, and combines digital received signals stored by the signal storage by using the one or more weighting coefficients.

8. The antenna device according to claim 2, wherein:
the signal detector converts the received signal of the array antenna into a digital signal and outputs the digital signal;

the signal storage stores the digital signal each time the digital signal is output from the signal detector; and the signal combiner specifies one or more weighting coefficients for suppressing a grating lobe included in a composite digital signal obtained when combining digital signals stored by the signal storage, from gains in a grating lobe direction in the radiation patterns set by the radiation pattern controller, and combines digital signals stored by the signal storage by using the one or more weighting coefficients.

9. The antenna device according to claim 1, wherein:
the signal detector includes a plurality of signal detection processors that are configured to detect received signals of the element antennas each time a radiation pattern of an array antenna is newly set by the radiation pattern controller; and the signal processor includes:
a digital beam forming unit to perform digital beam forming on the received signals of the element antennas detected by the plurality of signal detection processors, thereby to calculate the received signal of the array antenna;

a signal storage to store the received signal of the array antenna each time the received signal is calculated by the digital beam forming unit; and a signal combiner to specify one or more weighting coefficients for suppressing a grating lobe included in a composite signal obtained when combining received signals stored by the signal storage, from gains in a grating lobe direction in radiation patterns of the array antenna which are set by the radiation pattern controller, and combines received signals stored by the signal storage by using the one or more weighting coefficients.

10. The antenna device according to claim 9, wherein:

the radiation pattern controller sets, for the array antenna, a first radiation pattern indicating a gain in a pointing direction that is higher than a gain in a grating lobe direction, and sets, for the array antenna, a second radiation pattern indicating a gain in a pointing direction that is lower than a gain in a grating lobe direction;

the digital beam forming unit performs digital beam forming on the received signals of the element antennas detected by the plurality of signal detection processors when the first radiation pattern is set, thereby to calculate a received signal of the array antenna, and performs digital beam forming on the received signals of the element antennas detected by the plurality of signal detection processors when the second radiation pattern is set, thereby to calculate a received signal of the array antenna;

the signal storage stores the received signal calculated by the digital beam forming unit when the first radiation pattern is set, and stores the received signal calculated by the digital beam forming unit when the second radiation pattern is set; and the signal combiner specifies one or more weighting coefficients for suppressing a grating lobe included in a composite signal obtained when combining two received signals stored by the signal storage, from a gain in a grating lobe direction in the first radiation pattern and a gain in a grating lobe direction in the second radiation pattern, and combines the two received signals by using the one or more weighting coefficients.

11. A method for reducing a grating lobe, comprising:

in a radiation pattern controller, changing radiation patterns of plurality of element antennas which are configured to allow for switching among radiation patterns, thereby to set a plurality of radiation patterns of an array antenna including the plurality of element antennas at different times, one of the radiation patterns indicating a gain in a pointing direction that is higher than a gain in a grating lobe direction, another of the radiation patterns indicating a gain in the pointing direction that is lower than a gain in the grating lobe direction;

in a signal detector, detecting a received signal of the array antenna each time the radiation pattern of the array antenna is newly set by the radiation pattern controller to the one or the other of the radiation patterns; and in a signal processor, specifying a weighting coefficient for suppressing a grating lobe included in a composite signal obtained when combining received signals detected by the signal detector when the one and the other of the radiation patterns of the array antenna are respectively set at the different times, from respective gains in a grating lobe direction in the one and the other of the radiation patterns of the array antenna set by the radiation pattern controller, and combining the received signals respectively detected by the signal detector during the different times when the one and the other of the radiation patterns of the array antenna are respectively set, by using the weighting coefficient, wherein each of the respective radiation patterns of the array antenna is set using the same plurality of element antennas.

12. The method for reducing a grating lobe according to claim 11, comprising:

in a signal storage included in the signal processor, storing a received signal each time the received signal is detected by the signal detector; and in a signal combiner included in the signal processor, specifying one or more weighting coefficients for suppressing a grating lobe included in a composite signal obtained when combining a plurality of received signals stored by the signal storage, from gains in a grating lobe direction in radiation patterns of the array antenna which are set by the radiation pattern controller, and combining received signals stored by the signal storage, by using the one or more weighting coefficients.

13. The method for reducing the grating lobe according to claim 11, comprising:

in a plurality of signal detection processors included in the signal detector, detecting received signals of the element antennas each time the radiation pattern of the array antenna is newly set by the radiation pattern controller;

in a digital beam forming unit included in the signal processor, performing digital beam forming on the received signals of the element antennas detected by the plurality of signal detection processors, thereby to calculate the received signal of the array antenna;

in a signal storage included in the signal processor, storing the received signal of the array antenna each time the received signal is calculated by the digital beam forming unit; and in a signal combiner included in the signal processor, specifying one or more weighting coefficients for suppressing a grating lobe included in a composite signal obtained when combining received signals stored by the signal storage, from gains in a grating lobe direction in radiation patterns of the array antenna which are set by the radiation pattern controller, and combining received signals stored by the signal storage, by using the one or more weighting coefficients.

* * * * *